US011794884B1

(12) United States Patent
Hinman et al.

(10) Patent No.: US 11,794,884 B1
(45) Date of Patent: Oct. 24, 2023

(54) VTOL TAKE-OFF CONTROL SYSTEM

(71) Applicant: SiFly Aviation, Inc., Carmel Valley, CA (US)

(72) Inventors: Brian L. Hinman, Los Gatos, CA (US); Jeffrey G. Bernstein, Middleton, MA (US)

(73) Assignee: SiFly Aviation, Inc., Carmel Valley, CA (US)

( * ) Notice: Subject to any disclaimer, the term of this patent is extended or adjusted under 35 U.S.C. 154(b) by 579 days.

(21) Appl. No.: 16/913,195

(22) Filed: Jun. 26, 2020

Related U.S. Application Data

(60) Provisional application No. 62/866,904, filed on Jun. 26, 2019.

(51) Int. Cl.
*B64C 27/08* (2023.01)
*B64C 25/60* (2006.01)

(52) U.S. Cl.
CPC .............. *B64C 27/08* (2013.01); *B64C 25/60* (2013.01)

(58) Field of Classification Search
CPC .................................. B64C 27/08; B64C 25/60
See application file for complete search history.

(56) References Cited

U.S. PATENT DOCUMENTS

| | | | | |
|---|---|---|---|---|
| 3,350,035 A | * | 10/1967 | Schlieben | B64C 29/02 244/7 R |
| 5,521,827 A | * | 5/1996 | Lindberg | G01G 19/07 73/65.06 |
| 11,312,492 B1 | * | 4/2022 | von Flotow | B64D 5/00 |
| 2018/0065735 A1 | * | 3/2018 | Ichihara | B64D 47/08 |
| 2018/0149545 A1 | * | 5/2018 | Parkhurst | G01M 1/125 |
| 2020/0081432 A1 | * | 3/2020 | Szmuk | B64C 11/20 |

* cited by examiner

*Primary Examiner* — Christopher D Hutchens
*Assistant Examiner* — Steven J Shur
(74) *Attorney, Agent, or Firm* — Sunstein LLP

(57) ABSTRACT

An improved vertical takeoff aircraft of the type having a set of pads that are in contact with the ground when the aircraft is at rest on the ground and a controllable lift and propulsion system. The aircraft includes an array of force sensors coupled to the set of pads. The array has an output providing measurements over time of forces exerted on the pads along at least two independent axes. The aircraft also includes a controller, coupled to the lift and propulsion system and to the array of force sensors. The controller is configured to control the lift and propulsion system in a manner to counteract forces exerted externally on the aircraft that would cause undesired motion of the aircraft when on the ground and transitioning from the ground to flight.

18 Claims, 19 Drawing Sheets

VTOL TAKE-OFF CONTROL SYSTEM

PRIORITY

This application claims the benefit of U.S. Provisional Application No. 62/866,904, filed Jun. 26, 2019, which hereby is incorporated herein by reference in its entirety.

TECHNICAL FIELD

The present invention relates to aircraft capable of vertical take-off.

BACKGROUND ART

Vertical take-off and landing (VTOL) aircraft are those that can take-off and land with little or no forward speed. VTOLs include both those that carry human passengers and/or pilots, as well as those that do not, the latter generally referred to as UAVs (unmanned aerial vehicles) or drones.

Whether manned or unmanned, VTOLs can be categorized by how they are controlled. Control of a VTOL may be fully manual, such as a traditional helicopter, semi-autonomous, such as most modern remotely piloted drones, or fully autonomous, with no human pilot directly controlling the aircraft, other than, perhaps, its final destination.

When manually controlled, the human pilot directly manipulates all of the control degrees of freedom of the aircraft, and is fully responsible for both navigating the aircraft and maintaining stability in flight. For semi-autonomously controlled aircraft, while the specifics vary, the typical goal is for the automatic control system to be responsible for maintaining flight stability, leaving only the navigation task to the human pilot. For VTOLs in particular, many types of which are naturally unstable, this can significantly reduce the difficulty of piloting, and therefore can reduce the required skill level and training time of the pilot. For small commercial and consumer drones, semi-autonomous control systems have allowed remote piloting by unskilled amateurs.

For aircraft suitable for carrying people, the safety of the aircraft is paramount. The same is true of aircraft that can significantly affect the safety of those on the ground, such as large UAVs or those transporting heavy objects. For manually controlled aircraft, to ensure this safety, pilots must be highly trained and have extensive flight experience. For semi-autonomously or autonomously controlled aircraft, the control system must be responsible for ensuring safe operation under all conditions in which flights may take place.

For traditional manually controlled helicopters, one aspect of flight that the pilot must carefully handle is the transition from ground to flight during take-off, which can be particularly challenging during windy conditions, or when the aircraft takes off from sloped terrain. When the aircraft is on the ground with no lift from the rotors, friction of the skids (or whatever surface makes contact with the ground) prevents the force of the wind or the slope of the terrain from causing the aircraft to move. As the rotor lift increases, but prior to take-off, the force of the skids on the ground gradually decreases, until a point when the friction of the skids can no longer prevent strong wind gusts from causing the aircraft to slide or rotate. At this point, the pilot will typically manipulate the helicopter controls to counteract small movements. As the lift increases further, and friction gradually reduces to zero as the helicopter takes off, the pilot continues to adjust the controls to counter the varying forces as they occur.

For a human pilot to successfully counteract the effects of wind or sloped terrain during takeoff, the pilot must both anticipate the effects of wind and slope prior to any actual aircraft motion, based on various factors the pilot can observe, and also observe any actual undesired aircraft motion occurring as the take-off proceeds.

The need to avoid undesired motion due to wind or sloped terrain during the transition from ground to flight is common to any VTOL, including those that are semi-autonomously or autonomously controlled. For small commercially available unmanned drones, the effect of unintended motion during take-off is unlikely to significantly affect human safety, but for manned aircraft or large or heavy UAVs, the need to counteract this motion is essential.

Existing semi-autonomous or autonomous VTOLs include sensors, such as an inertial measurement unit (IMU), to measure both lateral and rotational motion, and use this information as input to their control systems. During takeoff, if a wind gust is strong enough to actually cause the aircraft to slide or rotate, this motion will be detected by the onboard sensors and the control system will attempt to apply counteracting forces. However, typically there is no information available to the automated control system that would allow it to anticipate the effects of wind prior to undesired motion actually occurring. As a result, at least some undesired motion can occur before the control system has an opportunity to counteract it. Depending on the strength of the forces and the time required to initiate the counteracting forces, significant unintended motion may occur, disrupting the take-off and potentially resulting in unsafe conditions, including the risk of the aircraft impacting nearby structures, trees or terrain.

SUMMARY OF THE EMBODIMENTS

In accordance with one embodiment of the invention, there is provided an improved vertical takeoff aircraft of the type having a set of pads that are in contact with the ground when the aircraft is at rest on the ground and a controllable lift and propulsion system. The improvement includes an array of force sensors coupled to the set of pads, the array having an output providing a measurements stream of forces exerted on the pads along at least two independent axes. The improvement also includes a controller, coupled to the lift and propulsion system and to the array of force sensors. The controller is configured to control the lift and propulsion system in a manner to counteract forces exerted externally on the aircraft that would cause undesired motion of the aircraft when on the ground and transitioning from the ground to flight.

Optionally, the controller is configured to control the lift and propulsion system in a manner to minimize a scalar-valued objective function that penalizes a series of undesirable conditions. Optionally, the objective function is configured so that total force applied to the aircraft in a plane parallel to the ground is close to zero upon take-off. Optionally, the objective function is configured so that total torque applied to the aircraft in a plane parallel to the ground is close to zero upon take-off.

Optionally, the controller is further coupled to a set of flight controls, and the controller is configured to control the lift and propulsion system based on indications of desired aircraft behavior provided by a pilot through the set of flight controls. Optionally, the controller is further coupled to an inertial measurement unit (IMU), and the controller is configured to control the lift and propulsion system based on acceleration and rotational motion measured by the IMU.

Optionally, each of the array of force sensors is a load cell having an analog front end (AFE) connected to an analog to digital converter (ADC).

Optionally, the lift and propulsion system includes a set of rotors, each rotor coupled to (i) a motor control operated by the controller to adjust the rotational velocity of the rotor, and (ii) a blade pitch control operated by the controller to adjust the pitch angle of the rotor's blade. Alternatively or in addition, for each rotor, the controller adjusts the rotational velocity of the rotor, by operating the motor control, and pitch angle of the rotor's blade, by operating the blade pitch control, to counteract the forces exerted externally on the aircraft. Alternatively or in addition, each rotor has a rotational plane that is tilted at a tilt angle, relative to the aircraft's position when at rest on the ground, that is adjustable by the controller. Alternatively or in addition, the controller is configured to adjust, in the course of takeoff, for each rotor, at least two parameters selected from the group consisting of tilt angle, rotational velocity, and blade pitch.

Alternatively or in addition, the set of rotors includes a front set of rotors and a rear set of rotors, and the controller is configured to adjust thrust of the front set of rotors relative to thrust of the rear set of rotors to maintain a desired aircraft pitch orientation when on the ground and transitioning from the ground to flight. Alternatively or in addition, the set of rotors includes four rotors or six rotors.

Optionally, the set of pads includes a front set of pads and a rear set of pads, and the array of force sensors is coupled to the rear set of pads. Optionally, the set of pads includes four pads. Optionally, at least one of the set of pads is coupled to three force sensors, arranged to measure the forces exerted externally on the aircraft in each of three directions. Alternatively or in addition, the aircraft is configured for takeoff on non-level ground, wherein the controller is configured to use the IMU to determine when the aircraft is on non-level ground and to control the lift and propulsion system in a manner taking into account the non-level ground.

DETAILED DESCRIPTION OF SPECIFIC EMBODIMENTS

Figure 1:
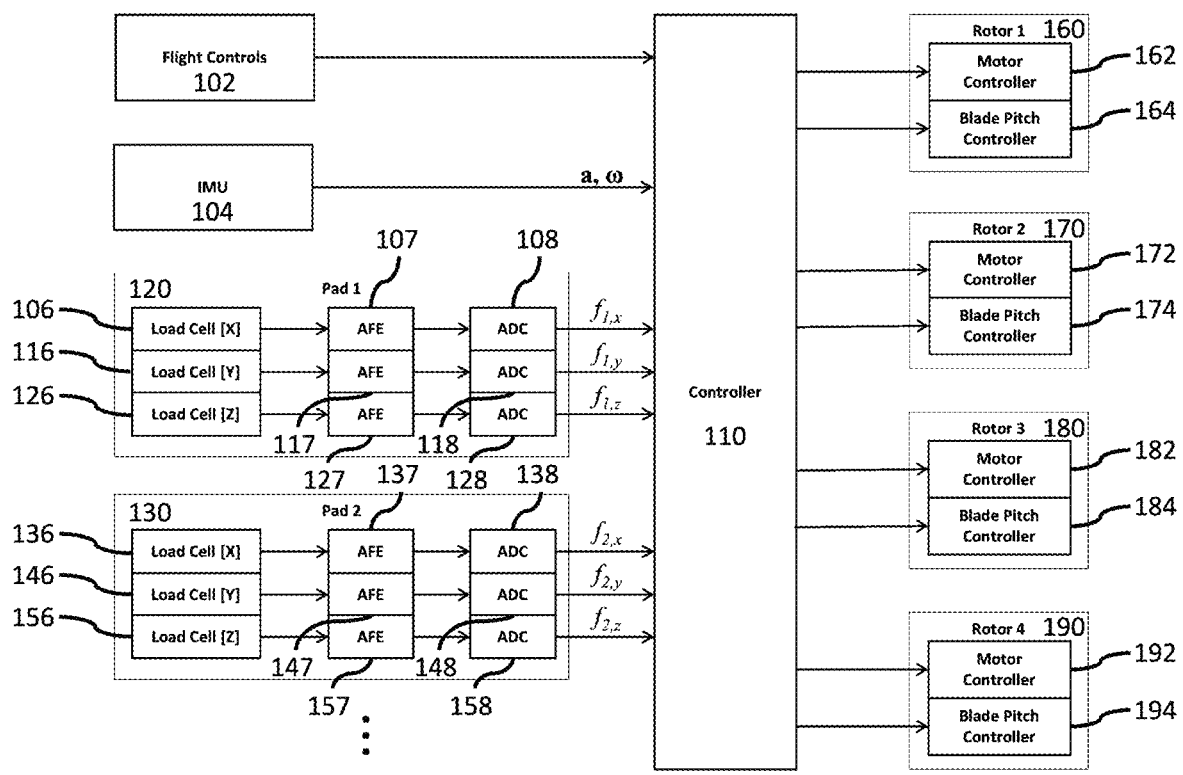
FIG. 1 is a block diagram showing components of a VTOL aircraft controller, in accordance with an embodiment of the present invention.

Definitions. As used in this description and the accompanying claims, the following terms shall have the meanings indicated, unless the context otherwise requires:

A "set" includes at least one member.

A "vertical takeoff aircraft" is an aircraft capable of taking off vertically.

A "pad" is a member of a set of locations at which a vertical takeoff aircraft is in contact with the ground when the aircraft is at rest on the ground. In some embodiments, each pad is designed to contact the ground at a single location, with a small area of direct contact. In some embodiments, a pad may contact the ground over an extended line, curve, or area. In some embodiments, a pad may be made from a rigid material, while in other embodiments may be made from a compliant material that provides some give in accordance with the normal force of the aircraft with the ground. In some embodiments, a pad is a wheel. In some embodiments, a pad is a wheel that can in some situations allow the aircraft to roll, but in other situations can be locked via brakes that prevent rolling. In some embodiments, a pad is a wheel with a fixed rolling orientation relative to the body of the aircraft. In other embodiments, a pad is a wheel with a changeable rolling orientation, such as a caster, for example, while in still other embodiments a pad is an omnidirectional wheel. In some embodiments a pad is connected rigidly to the body of the aircraft, while in other embodiments a pad is connected via a compliant connection, which may include a shock absorber to provide damping.

An array of sensors is "coupled" to a set of pads when the array is exposed to forces applied to the set of pads. For purposes of this definition, the array of sensors can be disposed directly on the set of pads, but need not necessarily be thus disposed. For example, when each pad in the set of pads is mounted on a distinct strut that is attached to the fuselage, then each sensor can be disposed between the strut and the fuselage, so as to receive and measure forces that are applied to the pad.

"Take-off" of an aircraft, of the type having a set of pads that are in contact with the ground when the aircraft is at rest on the ground, occurs when the sum of all contact forces applied to the pads has reached zero and the aircraft is undergoing at least some vertical acceleration.

A "lift and propulsion system" is a set of mechanisms of an aircraft to provide lift and propulsion of the aircraft together with corresponding control arrangements for that purpose.

A "measurement stream" is a time-series of measurement values associated with a parameter of interest.

The embodiments of the present invention disclosed are directed to a control system for VTOLs that can sense the presence of external forces, for example due to wind, whether or not the forces are strong enough to cause aircraft motion, while the aircraft is still in contact with the ground. The control system takes corrective action to counteract those forces to prevent undesired aircraft motion during and immediately after take-off. The system includes sensors to measure static forces on the aircraft while in contact with the ground, in addition to sensors to measure aircraft motion.

When the aircraft is at rest, as well as when it is in the process of taking off, one or more components of the aircraft are in direct contact with the ground. In the description of this invention, each of these components, regardless of the specific form, is referred to as a "pad." In one embodiment, there is a discrete set of pads, such that each pad is designed to contact the ground at a single location, with a small area of direct contact. In other embodiments, a pad may contact the ground over an extended line, curve, or area, for example a linear skid as often used in helicopters. In some embodiments, a pad may be made from a rigid material, while in other embodiments, it may be made from a compliant material that provides some give in accordance with the normal force of the aircraft with the ground. In some embodiments, a pad is a wheel. In some embodiments, a pad is a wheel that can, in some situations, allow the aircraft to roll, but in other situations can be locked via some form of brake that prevent rolling. In some embodiments, a pad is a wheel with a fixed rolling orientation relative to the body of the aircraft. In other embodiments, a pad is a wheel with a changeable rolling orientation, such as a caster, for example, while in still other embodiments a pad is an omnidirectional wheel. In some embodiments a pad is connected rigidly to the body of the aircraft, while in other embodiments, it is connected via a compliant connection, which may include a shock absorber to provide damping.

In one embodiment, each pad that may be in contact with the ground during the take-off process is coupled to a set of force sensors. Each force sensor may include a load cell, which converts a measurement of force to an electrical signal, for example a strain gauge load cell.

In a further embodiment, in which each pad in contact with the ground is in contact at a single location over a small area, there is no mechanism to significantly couple torque to a single pad via contact with the ground, and as such, the total external influence due to contact with the ground is well approximated by measuring a linear force vector. As such, in this embodiment, each such pad is coupled to three force sensors, arranged to measure force in each of three orthogonal directions. In other embodiments, the three force sensors are arranged to measure force in three linearly independent directions that may not be orthogonal. In other embodiments, a pad may be coupled two or more force sensors.

In various embodiments, the force sensors coupled to a pad are placed along a mechanical coupling that connects the pad to the body of the aircraft. In a further related embodiment, the force sensors are placed between the pad and the body of the aircraft such that together they measure the entire force coupled to the aircraft from that pad. In some embodiments, a pad may connect to the body of the aircraft through multiple mechanical couplings. In such cases, force sensors are placed along each such coupling. In some embodiments, the force coupled by each such mechanical coupling is in a linearly independent direction from that of the other couplings. In one embodiment, with three mechanical couplings to the body of the aircraft in each of three linearly independent directions, each coupling is configured with a single force sensor configured to measure the force at least in part along the direction of that coupling. In this case, the three force sensors may together determine the total contact force applied to the pad.

In other embodiments, for example where a pad is an elongated structure, there may be significant torque forces, as well as linear forces, coupled to the aircraft due to contact of the pad with the ground. In such embodiments, the pad may be configured to measure three independent components of torque in addition to the measured components of linear force. In other embodiments, in which a pad is an elongated structure connected to the body of the aircraft at multiple distinct locations, a set of linear force sensors may be coupled to a set of these connecting locations to allow determination of both force and torque on the pad. For example, for a pad configured as a linear skid coupled to the body of the aircraft at two distinct locations, in one embodiment, for each of these two locations, a set of three linear force sensors is placed along the mechanical connection between that location and the portion of the skid in contact with the ground.

The control system also includes a mechanism to measure aircraft motion, preferably including lateral acceleration in three dimensions, and rotational motion in three dimensions. In one embodiment, the mechanism is implemented by an IMU that includes a 3-axis accelerometer and 3-axis gyroscope. The control system includes, among its inputs, the measurements from the force sensors coupled to some or all of the pads, as well as the measurements from the IMU. The force measurements supplied to the control system (also referred to as a controller) are used both to determine the net lateral force on the aircraft, and to determine the net torque applied to the aircraft. If the forces across the aircraft are unequal, there will be a net rotational torque that the controller must counteract in addition to the net lateral force. In various embodiments, the sensor on each pad measures only lateral forces in each of three dimensions. With more than one pad in contact with the ground, the controller uses the relative force across the pads to determine the net rotational torque.

When engaged and when there is no motion of the aircraft, the controller uses the lateral and rotational force estimates to continuously adjust the controllable degrees of freedom of the aircraft so that the resulting net lateral and rotational forces are as close as possible to zero. If motion of the aircraft is detected, the controller continuously adjusts these degrees of freedom to reduce the net motion to zero as well and as the aircraft stops lateral and rotational motion, further adjust the forces to as close as possible to zero. As the lift from the rotors is increased to the point of take-off, the contact force between the pads and the ground decreases toward zero, and as it does, so do the contact frictional forces that counteract any applied force or torque. At the time of take-off, these frictional forces cease, and any remaining external lateral or rotational forces will cause motion of the aircraft. By minimizing or eliminating these forces prior to take-off, this undesired motion can be prevented or at least reduced.

Information from the sensors may be either continuous in time or at a discrete sampling rate, and similarly the control inputs to the controllable degrees of freedom may be either continuous in time or at a discrete update rate. And while the controller itself can operate either continuously or at discrete intervals, it is typical that the controller samples the inputs at a discrete rate and modifies its outputs, corresponding to the inputs to the controllable degrees of freedom, at a discrete rate, which in some embodiments is the same as the input sample rate. Calibration to correct offset and gain mismatch of the sensor data, or nonlinearities in the sensor transfer function, may be done either prior to providing the data to the controller, or within the controller. It is assumed that the magnitude of random measurement error from each sensor is known either at the time of design or via a calibration procedure. This may be in the form of error standard deviation, confidence bounds, or other similar means of expression.

In embodiments in which the contact of a pad is coupled to the associated force sensors via a compliant medium, which may include a damping mechanism, the input to the controller may account for the temporal transfer function of this coupling in estimating the contact force at a given time. In one embodiment, this transfer function may be determined ahead of time, either at the time of design, or during system calibration, and this information used to estimate the actual force. In some embodiments, a Kalman filter may be used to estimate the force at successive moments in time using the estimated transfer function and measurement noise. Estimation of force to account for this temporal transfer function may be done either in a system that provides the inputs to the controller, or within the controller itself.

In various embodiments, at each sampled time step, the values available to the controller include the following:

$f_i$: Force vector measured at a pad at a known position $r_i$ relative to body frame of reference of the aircraft, for each of N pads in contact with the ground, where $i \in 1 \ldots N$.

a: Acceleration vector of the aircraft as measured by the IMU.

ω: Angular rotation of the aircraft as measured by the IMU, typically measured in terms of a rotation rate about each of three orthogonal axes.

The controller may make use of additional sensor inputs as well, including, for example, a wind velocity sensor.

In estimating the force vector associated with each pad from a set of force vector inputs, the controller may transform the measured values in accordance with the particular sensor configuration. If the sensors on a given pad are configured to measure the force in three orthogonal directions, and those directions are aligned with the body frame of reference of the aircraft, then the force vector is formed by directly concatenating the three components. If the three components are orthogonal, but in a different orientation, then the three components are concatenated and multiplied by an appropriate orthonormal rotation matrix, or equivalent rotation computation. If the three directions of the three force sensors are not orthogonal, the components of the force vector in the body frame of reference may be estimated, for example, by a least-squares estimator.

In this document, the component axes of the body frame of reference, $\mathbb{R}_b$, are referred to either by label: x, y, and z; or by description, respectively, as longitudinal (back-to-front), transverse (side-to-side), and vertical (bottom-to-top) axes, relative to the typical forward direction of the aircraft. The origin of the body frame is at the center of mass of the aircraft, which may or may not be known exactly.

The axes of the ground frame of reference, $\mathbb{R}_g$, corresponding to the external environment, are referred to by indices x', y', and z', where the x', y' plane corresponds to the surface upon which the aircraft is in contact when at rest. If the surface that the aircraft is resting on is level, then the gravitational force is in the −z' direction. If the surface that the aircraft is resting on is not level, then it is useful to define the x', y' plane as the plane associated with the contact points on this surface (if there are three contact points when the aircraft is fully at rest then these points define the surface plane, regardless of the regularity of the surface; otherwise, if the ground is not level, but approximately flat, then x', y' plane corresponds to the effective plane of the surface). In this case, the gravitational force is not exactly in the −z' direction, but has a nonzero component in the x', y' plane. In the embodiments described, the effect of a nonzero gravitational force component in the x', y' plane is treated equivalently to any other force in this plane, such as wind. In other embodiments, the gravitational force vector may be determined directly, for example using the accelerometer information from the IMU prior to the beginning of the take-off process and may be accounted for explicitly by the controller in estimating and counteracting the external forces.

Under static conditions (when there is no net motion or rotation of the aircraft), the controller uses the measured forces, $f_i$, to estimate the total external force, $f_e$, and external torque, $\tau_e$, using the definitions of total force and torque:

$$f_e = -\sum_{i=1}^{N} f_i$$

$$\tau_e = -\sum_{i=1}^{N} r_i \times f_i$$

Note that the total external force and torque includes the forces from wind, the downward force of gravity, as well as the lift and torque from the rotors. Under static conditions, the static friction of the pads counters some or all of these forces, and will prevent motion of the aircraft as long as the total forces are kept sufficiently small.

FIG. 1 is a block diagram showing the high-level components of a VTOL aircraft controller 110, in accordance with an embodiment of the present invention. On the left of FIG. 1, the inputs to the controller 110 are shown. These inputs include the flight controls 102 that the pilot uses to indicate the desired behavior of the aircraft, and an IMU 104, which provides measurements of overall aircraft acceleration and rotational motion. These inputs also include a first array of three force sensors 106, 116, 126 coupled to a first pad 120, and a second array of three force sensors 136, 146, 156 coupled to a second pad 130. FIG. 1 shows two pads 120, 130, in accordance with one embodiment described, though additional pads coupled to force sensors may be used in other embodiments. In the embodiment of FIG. 1, each pad 120, 130 is coupled to three force sensors, though a different quantity of force sensors may be coupled to a pad in other embodiments.

In the embodiment of FIG. 1, each force sensor 106, 116, 126, 136, 146, 156 is a load cell and senses force in a particular dimension, corresponding to the x, y, and z axes of the body reference frame, respectively for each pad. Each load cell 106, 116, 126, 136, 146, 156 connects to a corresponding analog front end (AFE) 107, 117, 127, 137, 147, 157, which translates the force measurement to an electrical analog signal suitable for digitization. An AFE for a strain gauge load cell typically includes a Wheatstone bridge connected to one or more amplifiers. In the embodiment of FIG. 1, the amplified output from each AFE 107, 117, 127, 137, 147, 157 is input to a connected analog to digital converter (ADC) 108, 118, 128, 138, 148, 158 to convert the electrical analog signal to a discrete-time digital signal suitable for analysis by the controller 110. The controller 110 is responsible for interpreting the sensor inputs as well as the flight-control inputs from the pilot and determining what actions to take at each point in time.

The controller 110 manifests those actions by controlling the propulsion and lift system of the aircraft, including rotor 1 160, rotor 2 170, rotor 3 180, and rotor 4 190. In some embodiments, such control is via inputs to the controllable degrees of freedom associated with each rotor. The embodiment of FIG. 1 includes four rotors, though other embodiments may include a different quantity of rotors. For each rotor 160, 170, 180, 190, in the embodiment of FIG. 1, the controller 110 provides input to its corresponding motor controller 162, 172, 182, 192, by which the controller 110 adjusts the rotational velocity of the rotor 160, 170, 180, 190. For each rotor 160, 170, 180, 190, the controller 110 also provides input to its corresponding blade pitch controller 164, 174, 184, 194, by which the controller 110 adjusts the pitch angle of the rotor's blades. In some embodiments, only one or the other of these controls (motor control or blade pitch control) may be controllable; while in other embodiments, there may be additional controllable properties of the aircraft that can be adjusted by the controller 110.

Aircraft Configuration: Quadrotor with Tilted Rotor Plane

In one embodiment of the present invention, the aircraft is a quadcopter, with four equal-size rotors with counter-rotating rotor pairs. In this embodiment, the controller has access to a total of eight primary independently controllable degrees of freedom. Specifically, the rotational velocity of each of the four rotors, and the blade pitch of each of the four rotors. In another embodiment, only the rotational velocity of the rotors is controllable during this stage of operation. While in yet another embodiment, only the blade pitch of the four rotors is controllable during this stage of operation.

In this quadrotor embodiment, the plane of the rotors is tilted approximately 12 degrees forward relative to the resting position of the aircraft on the ground (to be optimized for forward flight). In this embodiment, each of the four rotors has an additional dihedral angle of approximately 2 degrees, both in the transverse and longitudinal directions. In alternative embodiments, there is no additional dihedral tilt, or there is dihedral tilt in one direction but not the other. For each rotor, the lifting force due to rotation of the rotor blade is approximately normal to the plane of that rotor.

For approximately vertical take-off when there is little or no wind, as the rotors gradually increase rotational speed and lift to the point of take-off, the average plane of the rotors will be approximately horizontal, so that the net lifting force will be in the positive z' direction, directly opposing the gravitational force. Given the initial forward tilt of the average rotor plane, this means that in the process of gradually increasing lift, the aircraft pitches back, in this embodiment by approximately 12 degrees. As the aircraft pitches back, whatever pads or skids in the front of the aircraft that had been in contact with the ground are no longer in contact, and only two pads in the rear of the aircraft are in contact with the ground. During take-off with wind, the net force and torque on the aircraft will include additional components, and so the final average rotor plane at the point of take-off may differ from horizontal to counter these additional forces. In either case, in this quadrotor embodiment, the takeoff process begins with an initial tilt that leaves only the rear two pads in contact with the ground.

To measure the external force and torque on the aircraft during this gradual transition, the sets of force sensors coupled to the two rear pads measure the contact forces on the aircraft. The force sensor measurements of each of these pads are used to compute the net external force and the two unknown components of external torque. These measurements are used by the controller during the period after the front pads lose contact with the ground until the point of take-off, when the entire aircraft loses contact with the ground. In this embodiment, N=2, meaning two pads are in contact with the ground until the point of take-off.

Figure 2:
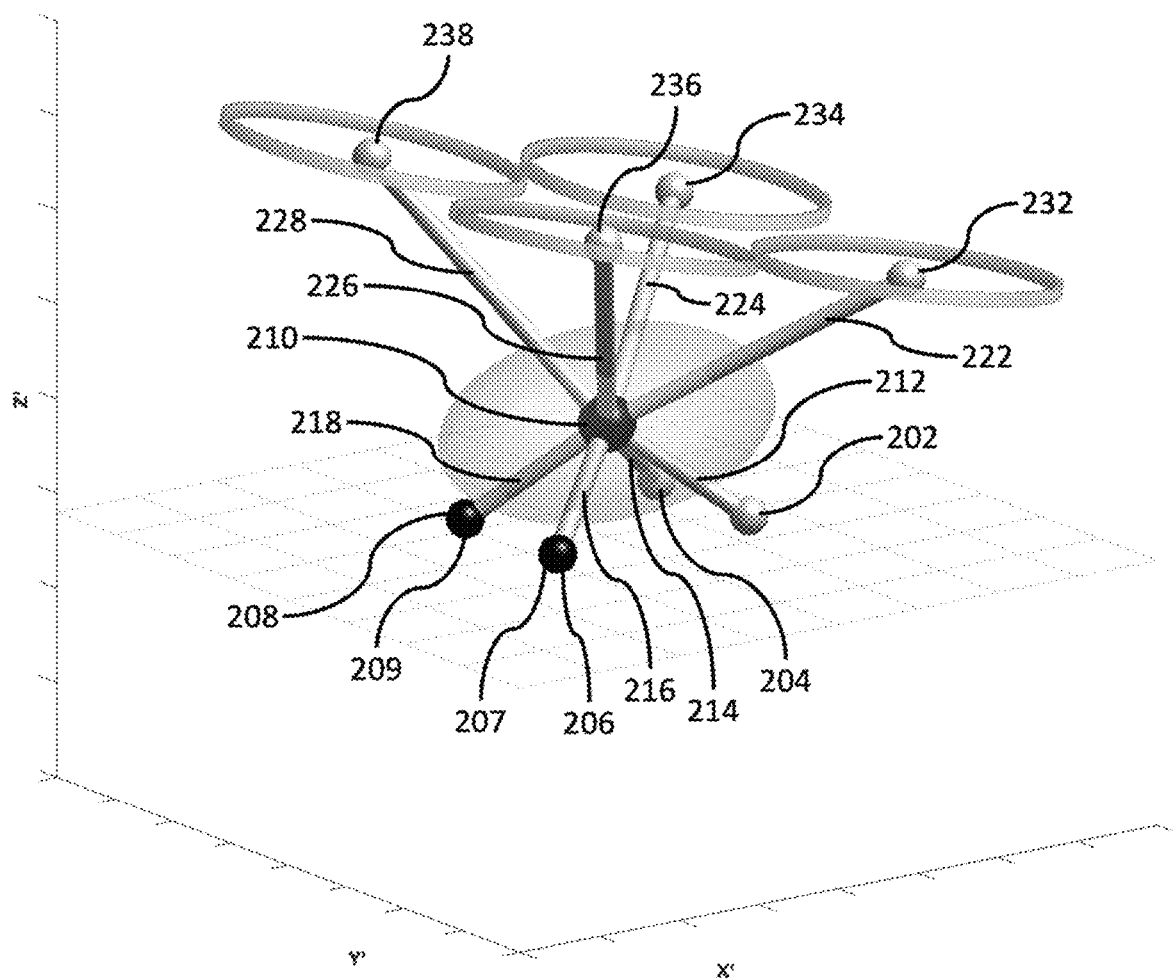
FIG. 2 is a perspective view of a schematic representation of a four-rotor aircraft configured with four pads, of which the two rear pads are each coupled to a set of force sensors, in contact with the ground, in accordance with an embodiment of the present invention.

FIG. 2 is a perspective view of a schematic representation of a schematic representation of a four-rotor aircraft configured with four pads, of which the two rear pads are each coupled to a set of force sensors, in contact with the ground, in accordance with an embodiment of the present invention. FIG. 2 shows the two rear pads 206, 208 coupled to sets of force sensors 207, 209, each depicted as a dark sphere, the four rotors 232, 234, 236, 238, each depicted as a large ring. Each of the rotors 232, 234, 236, 238 connect to the center of mass 210, depicted as a larger dark sphere, by rigid rods 222, 224, 226, 228. Each of the pads 202, 204, 206, 208 connect to the center of mass 210 by rigid rods 212, 214, 216, 218. In the position shown, the aircraft is at rest on level ground, such that all pads 202, 204, 206, 208 are in contact with the ground. In this example embodiment, the transverse position of the center of mass 210 coincides with the transverse dimension of the geometric center of the aircraft, though this is not required. The plane of each rotor 232, 234, 236, 238 is shown by the circular rings. The lifting force from each rotor 232, 234, 236, 238 is approximately normal to the plane of each rotor and applied at the hub of the rotor, shown as a -sphere (depending on wind conditions and interactions between rotors, the lifting force may differ from this to some degree). The axes of FIG. 2 correspond to the ground frame of reference, $\mathbb{R}_g$. For clarity, FIGS. 3A-3C shows orthographic projections of the same aircraft configuration.

Figure 3A:
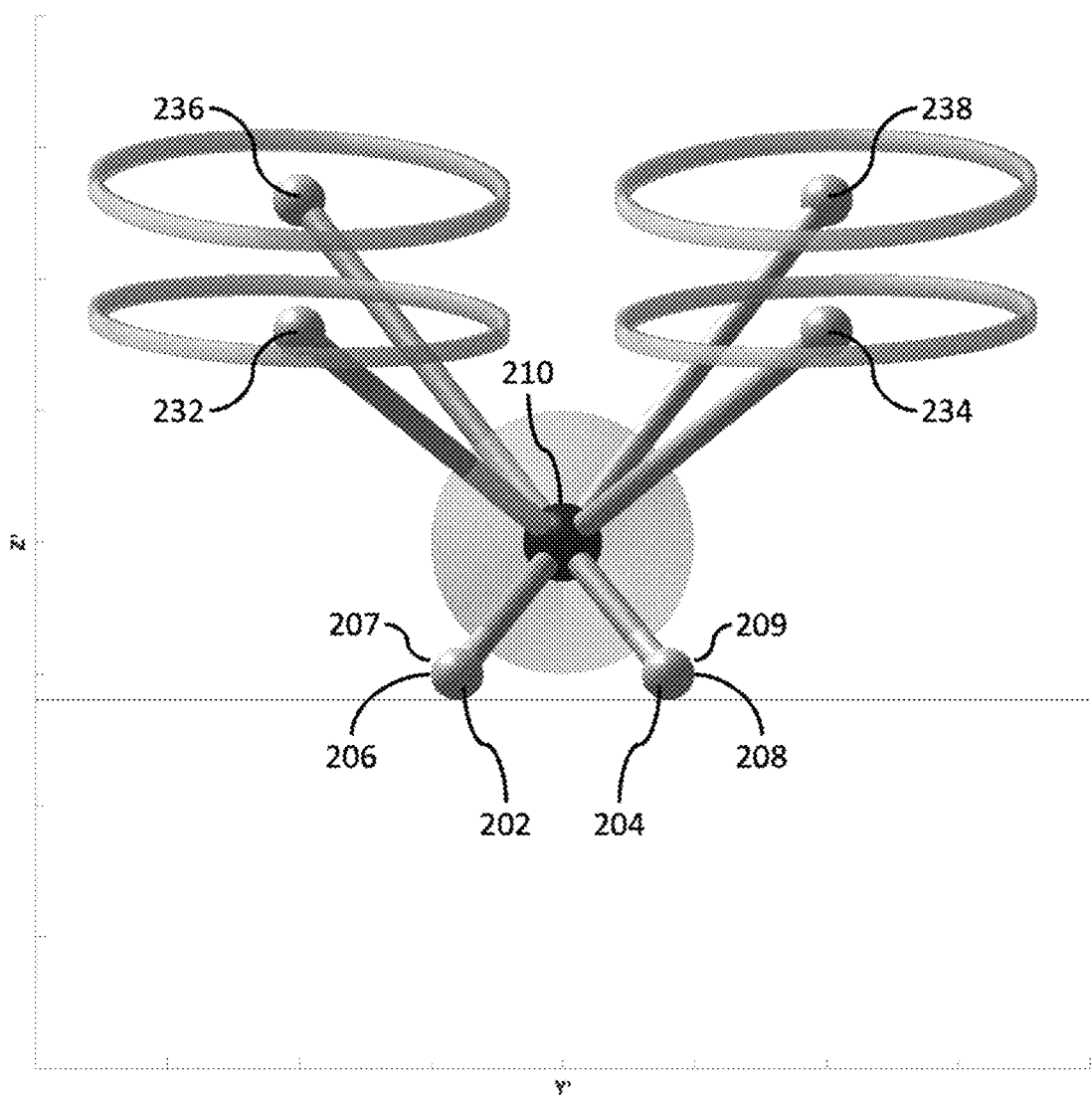
FIG. 3A is a front view of the aircraft of FIG. 2 in contact with the ground.

FIG. 3A is a front view of the aircraft of FIG. 2 in contact with the ground.

Figure 3B:
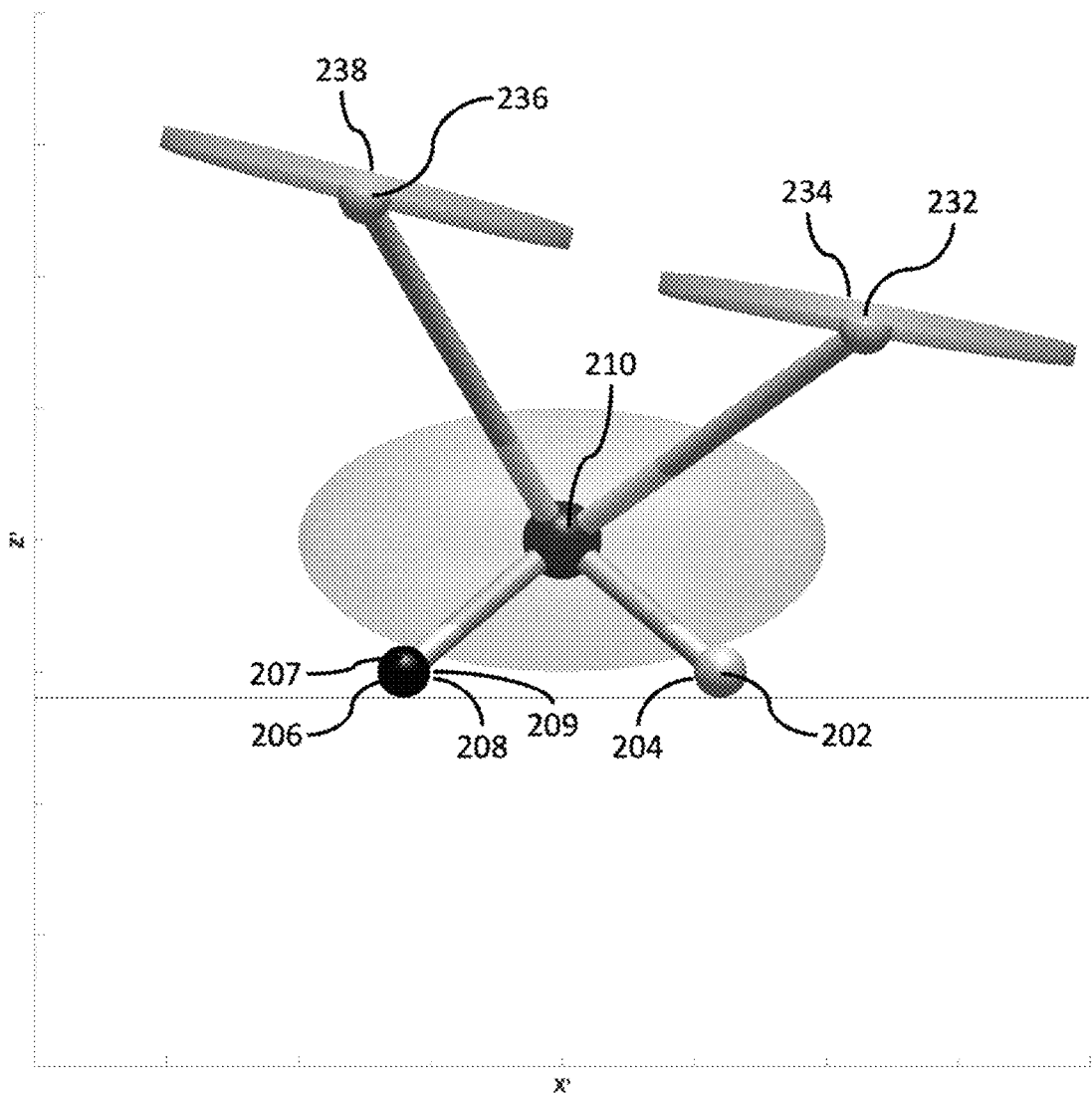
FIG. 3B is a side view of the aircraft of FIG. 2 in contact with the ground.

FIG. 3B is a side view of the aircraft of FIG. 2 in contact with the ground.

Figure 3C:
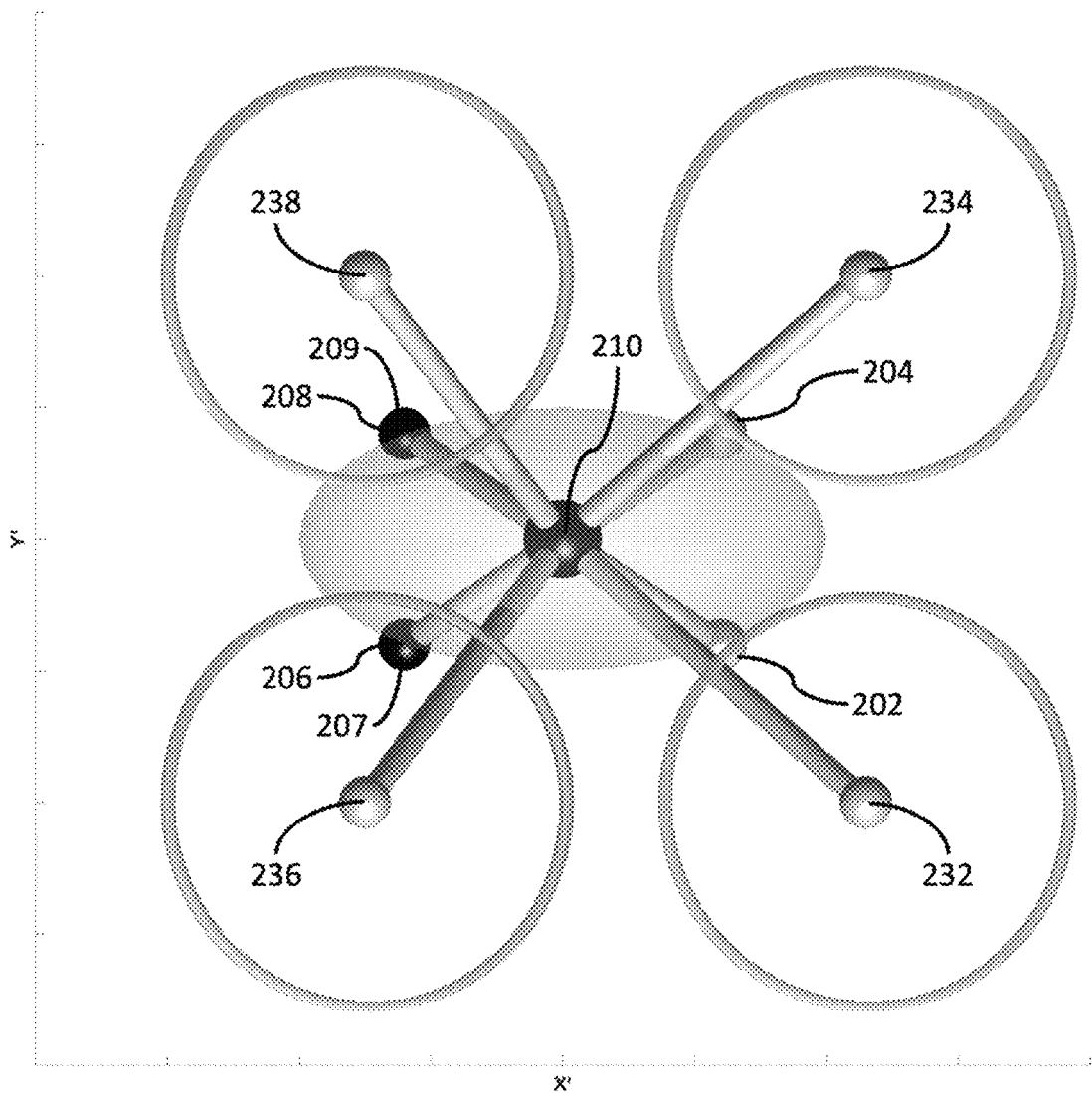
FIG. 3C is a top view of the aircraft of FIG. 2 in contact with the ground.

FIG. 3C is a top view of the aircraft of FIG. 2 in contact with the ground.

In this embodiment, as distinguished by a tilted rotor configuration and force sensors 207, 209 associated with the two rear pads 206, 208, the take-off process can be described as having two phases. The initial phase involves increasing the lift primarily on the two front rotors until the front two pads 202, 204, lose contact with the ground. The final phase of the take-off process involves the transition from this point to the point at which all pads lose contact with the ground. For this embodiment, the procedure described involves the final phase only, and thus involves only the two rear pads (subsequently referred to as pads 206, 208) and the associated sensors.

During the take-off process, the contact friction of the pads 206, 208 directly counteracts the external lateral forces as the yaw component of any external rotational force, and the roll component is countered by the contact force between the pads 206, 208 and the ground, but the pitch component is countered by the thrust from the rotors 232, 234, 236, 238. Specifically, the controller adjusts the relative thrust of the front two rotors 232, 234 versus the rear two rotors 236, 238 (using rotational speed, blade pitch, or both) to maintain the desired pitch orientation of the aircraft during each stage of this process. This relative thrust counteracts both the torque due to gravity acting on the center of mass 210 of the aircraft, which is forward of the rear pads 206, 208 in this embodiment, as well as any torque around the pitch axis due to external forces, such as wind.

For each pad 206, 208, by the definition of static friction, the magnitude of lateral force that can be maintained without sliding is proportional to the normal force on the pad, where the proportionality constant is referred to as the coefficient of static friction. In embodiments in which each pad 206, 208 contacts the ground at a single location with small area of contact, it is a good approximation to consider a single force of contact on that pad 206, 208, and a single coefficient of static friction. In this case, we would like the controller 110 to maintain the lateral forces on each pad 206, 208 such that:

$$\|f_{i,x',y'}\| \leq \mu_s |f_{i,z'}|$$

Here, $f_{i,x',y'}$ is the projection of the total force on the pad i, $f_i$, onto the x', y' plane parallel to the ground, $f_{i,z'}$ is the z' component of $f_i$, and $\mu_s$ is the coefficient of static friction. As the overall lift increases, the normal force, $f_{i,z'}$, gradually decreases to zero, and thus the lateral forces must also decrease toward zero to prevent sliding.

Figure 4:
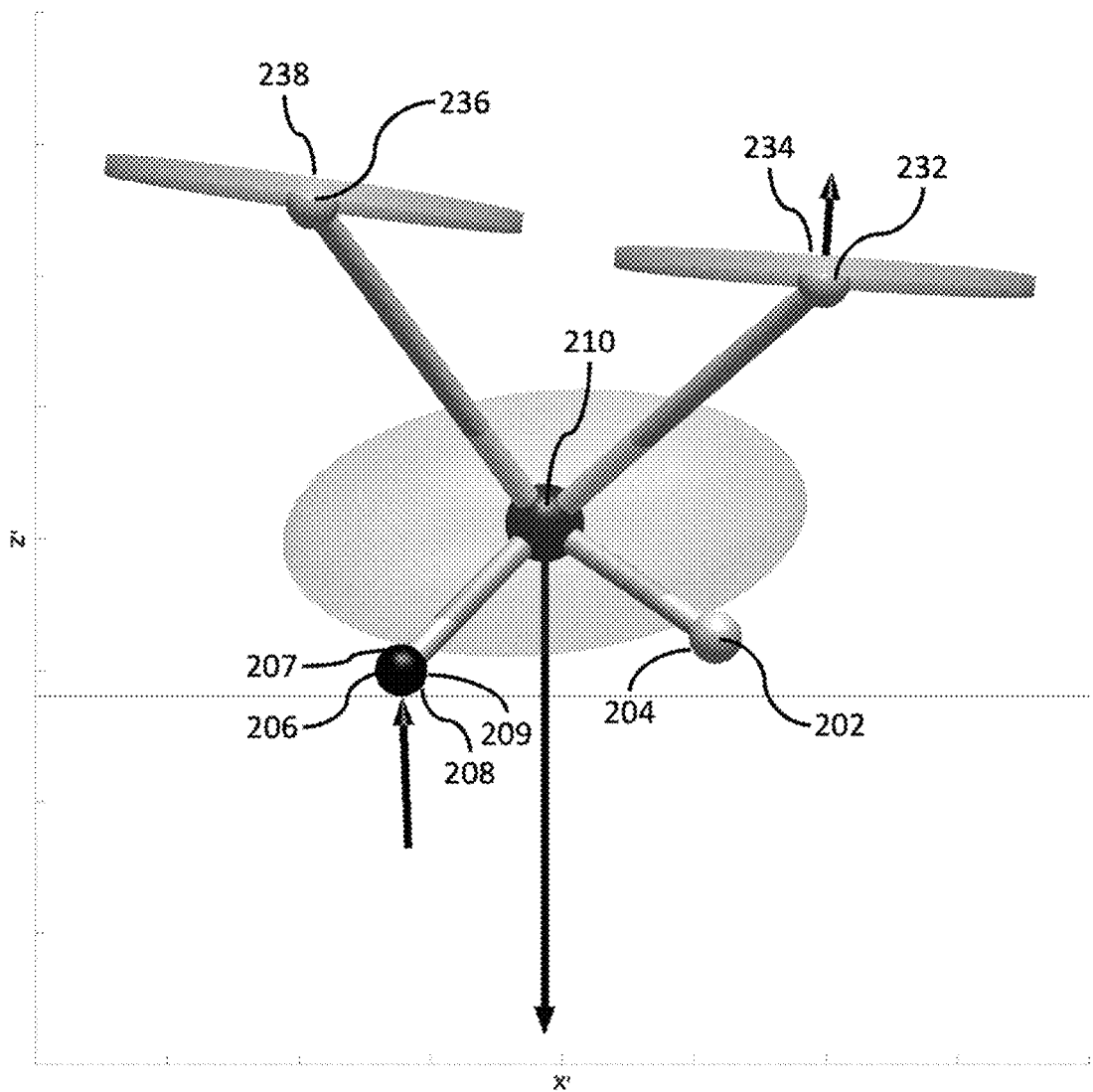
FIG. 4 is a side view of the aircraft of FIG. 2, partially pitched back by 6 degrees, with the two rear pads remaining in contact with the ground, in accordance with an embodiment of the present invention.

FIG. 4 is a side view of the aircraft of FIG. 2, partially pitched back by 6 degrees, with the two rear pads 206, 208 remaining in contact with the ground The axes of FIG. 4 correspond to the ground frame of reference, $\mathbb{R}_g$. FIG. 4 shows the external force vectors acting on the aircraft, depicted as arrows, including the gravitational force acting on the center of mass 210 in the −z' direction, and the lifting forces from the rotors 232, 234, 236, 238 acting approximately normal to the plane of the rotors 232, 234, 236, 238. In this example, the forces are computed assuming there is no external force from wind and the ground is level so that the force of gravity is exactly in the −z' direction. Assuming the static friction of the pads 202, 204, 206, 208 is sufficient to prevent sliding, the contact forces on the rear pads 206, 208 exactly counter the lift and gravitational forces. The arrows pointing into the rear pads 206, 208 show the contact force on each, which includes the normal force against the ground plus the lateral static frictional force, and corresponds to the force measured by the force sensor 207, 209 coupled to each rear pad 206, 208. In this example, due to the non-zero pitch of the plane of the front rotor blades 232, 234, there is a small backward static friction force to prevent sliding. The forces shown on the two front rotors 232, 234 are scaled to hold the pitch of the aircraft still under the conditions assumed. Slightly larger rotor forces can be used to pitch the aircraft further back to a different configuration.

In the embodiment of FIG. 4, the axis of rotation of the aircraft around the two contact points between the pads 206, 208 and the ground is parallel with the y axis. While this axis is temporarily fixed by friction, to maintain a fixed pitch orientation of the aircraft, the rotational moment due to the overall lift must counter the moment due to gravity as well as any additional torque around the y axis due to wind. Ignoring briefly any additional torque component around this axis due to wind, the lifting force must be forward of the center of mass 210. The longer moment arm to the rotation axis relative to the center of mass 210, allows the upward lifting force to be less than the downward force of gravity, allowing an upward normal force on the pads 206, 208 to balance the total forces. This remaining normal force on the pads 206, 208 allows static friction to provide some continued resistance to lateral motion. The more forward the lifting force is, the lower it can be while maintaining the pitch, and the larger the normal force on the pads 206, 208 will be. Therefore, in the early stage of take-off, the front two rotors 232, 234 should be used to provide as much thrust as possible before starting to use the rear two rotors 236, 238.

Figure 5:
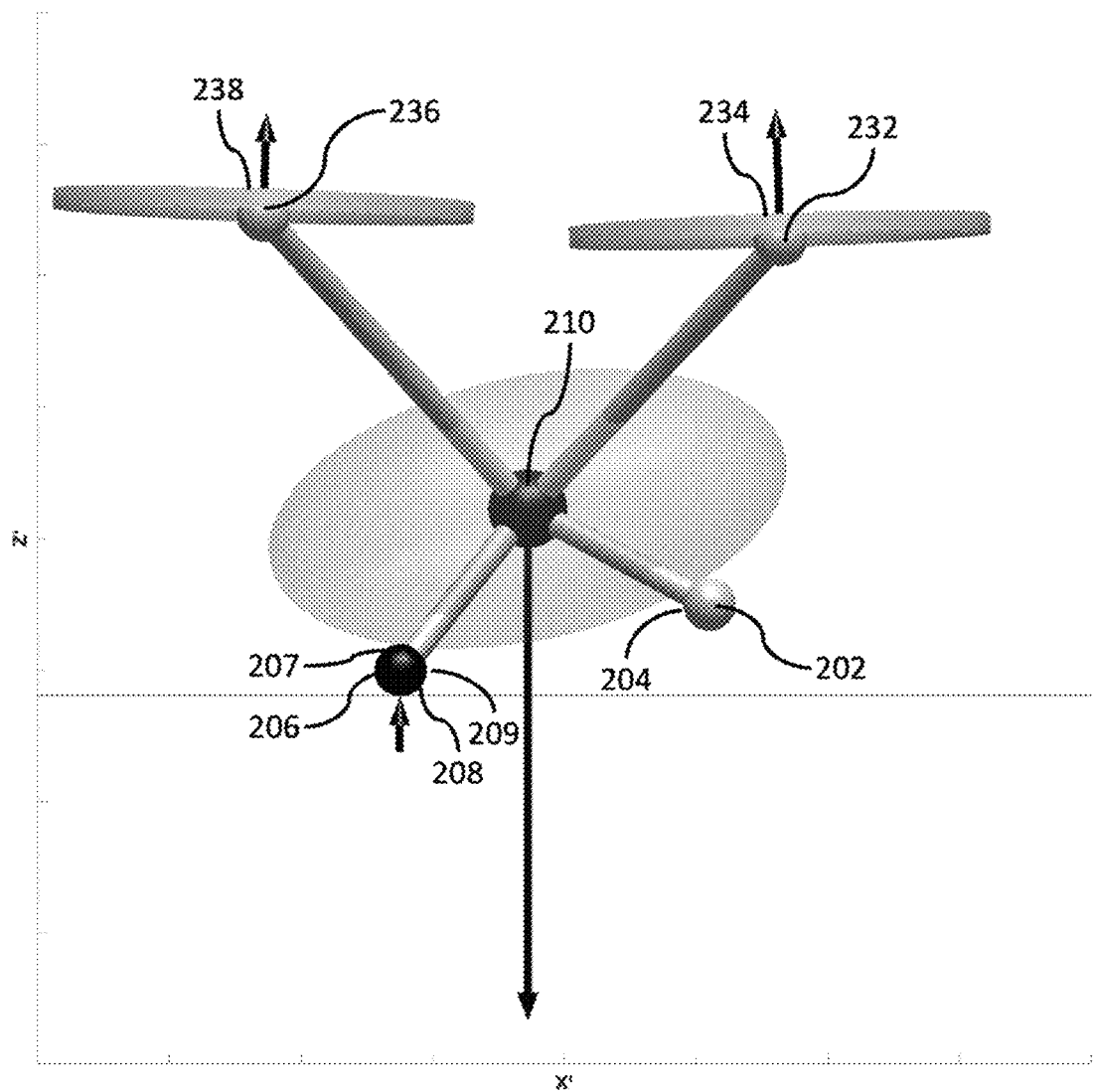
FIG. 5 is a side view of the aircraft of FIG. 2, pitched back by 12 degrees, such that the average plane of the rotors is approximately horizontal, in accordance with an embodiment of the present invention.

FIG. 5 is a side view of the aircraft of FIG. 2, pitched back by 12 degrees, such that the average plane of the rotors is approximately horizontal. The axes of FIG. 5 correspond to the ground frame of reference, $\mathbb{R}_g$. In this example, there is lift from the front rotors 232, 234 and rear rotors 236, 238, and the overall lift is larger than in the example of FIG. 4. As such, the normal contact force against the pads 206, 208 is smaller than in FIG. 4. Because the average rotor plane is horizontal in this case, the lateral component of the contact force of the pads 206, 208 is small, though not quite zero due to the non-equal lift forces on the front rotors 232, 234 and rear rotors 236, 238. The specific balance of front and rear lift shown is to maintain the pitch of the aircraft in this configuration. Again, the forces shown in this example assume no wind and level ground.

At this stage, just before take-off, the lift from all rotors 232, 234, 236, 238 can be increased in the appropriate proportion to maintain a minimum lateral component of the contact force on the pads. Because the normal force on the pads 206, 208 is decreasing toward zero during this phase, the reduction of the lateral component becomes necessary to prevent sliding.

In a related embodiment, the pads 202, 204, 206, 208 are wheels. If a wheel is in a fixed orientation with no braking applied, then the effective friction is anisotropic, dependent on rolling resistance in the line perpendicular to the wheel's axis and static friction along the line parallel to the wheel's axis. If a wheel is a caster with no braking applied, the effective friction is more complex, and dependent on the state of the wheel's orientation. If the wheel is omnidirectional, the effective friction corresponds to the rolling resistance along any direction. In any of these cases, with braking applied to the wheel to a degree that the maximum lateral force to prevent sliding due to static friction between the wheel and the ground is less than the maximum lateral force to prevent rolling, then the wheel can be treated equivalently to a fixed non-rotating pad, as described previously. In some embodiments, little or no braking is applied to one or more wheels that are in contact with the ground during the take-off process. In that case, the controller 110 accounts for the corresponding frictional behavior of each wheel to prevent undesired motion during take-off. In some embodiments, the controller 110 may incorporate information from additional sensors, which may include sensing the current orientation of a caster, or the degree of braking currently applied to each wheel. In some embodiments, the controller 110 directly controls the braking to each wheel and ensures that sufficient braking is applied to all wheels that are in contact with the ground during the take-off process. In other embodiments, the pilot is responsible for ensuring that braking is applied to each such wheel during the take-off process.

The goal of the controller 110 is to adjust the controllable degrees of freedom to increase overall lift to reach the point of take-off, while both preventing sliding of the aircraft during this process, and to prevent any rotation or lateral motion as the aircraft reaches the point of take-off and leaves contact with the ground. In some embodiments, the controller 110 has access to up to eight directly controllable degrees of freedom: the rotational velocity of each rotor 232, 234, 236, 238, and the blade pitch of each rotor. Both rotational velocity and blade pitch affect the thrust in the direction approximately normal to the rotor 232, 234, 236, 238, such that an increase in either will increase the thrust. The actual thrust produced is also affected by the motion of the air relative to the rotors 232, 234, 236, 238. In windy conditions, the wind affects not only the net forces on the aircraft that the controller 110 is attempting to counter, but also the precise thrust produced by each rotor 232, 234, 236, 238 at a given rate of rotation and blade pitch. The interaction of air motion between blades, as well as the ground effect, also affects the actual lift from each rotor 232, 234, 236, 238 for a given rotation velocity and blade pitch. Each rotor also produces torque, which is a function of the rotational drag of the rotor blades, and is a function of both the rotational velocity and blade pitch. For a given lift, there is a combination of rotational velocity and blade pitch that minimizes drag for a given lift and therefore torque. There is a continuum of combinations of rotational velocity and blade pitch that result in the same lift, but have larger drag and therefore torque. For a given drag, adjusting these along this continuum can provide control of the torque due to each rotor independent of the lift from that rotor. As with lift, wind, ground effect, and interaction between rotors can affect the combination of values that result in a specific torque.

In various embodiments, pairs of rotors both along the longitudinal and transverse directions rotate in opposite directions. Thus, when pairs of counter-rotating rotors are rotating at exactly the same rate, there is no net torque on the aircraft. Note that this does not require that all rotors be rotating at the same rate, only that either: the front pair and rear pair are at the same rate, or the left pair and right pair are at the same rate. The rotors can be used to create a net torque in the yaw direction by choosing a rate of rotation of one or more of the clockwise rotating rotors different from those of one or more of the counterclockwise rotating rotors. In the case the rotors have a slight dihedral angle, this torque will also have small components around the other axes.

At the beginning of the take-off process, the z' component of the total force on all surfaces in contact with the ground will start out at a large value, corresponding to the overall weight of the aircraft, possibly modified slightly by a z' component from the wind and the effect of non-level ground. The controller 110 will gradually increase its total lift as a function of time, to reach the take-off point where this component of force drops to zero. In some embodiments, the controller increases this component of lift using a predetermined function of time, while in other embodiments, the target rate of lift increase may depend on other factors. The controller may operate the lift and propulsion system in a manner to provide current and future values of the target vertical lift based on factors that include the intentions of the pilot, as known to the controller 110 through the flight controls 102; the past and current states of the aircraft, including the measured values from the IMU 104 and pad force sensors 207, 209 (shown as 106, 116, 126, 136, 146, 156 in the embodiment of FIG. 1); the prior actions taken by the controller during the take-off process; and the current state and known limitations of the control degrees of freedom. Regardless of the method used to determine this target, at any given time there is a target, for the overall vertical lift, that the controller 110 uses to determine the target component of the total external force normal to the ground (in the case of level ground), $f_t$, which is time varying and gradually decreases toward zero during the take-off process. This target normal force is the total weight of the aircraft minus the target lift.

The controller 110 uses all of the measurement inputs and continuously attempts to minimize a suitable scalar-valued objective function. An objective function suitable for the desired behavior of the controller 110 is one in which the total cost objective simultaneously penalizes a series of undesirable conditions. The set of conditions to penalize, which forms components of an overall objective function, is explained below.

(1) The total external force on the aircraft in the x', y' plane parallel to the ground should not exceed the maximum force of static friction that would prevent sliding given the current normal force on each pad 202, 204, 206, 208. Given uncertainty in the coefficient of friction on each pad 202, 204, 206, 208, and noise in the force measurements from the sensors 207, 209 on each pad, this component of the objective function should vary in accordance with the likelihood of exceeding the maximum force of static friction given the force measurement data and the characterization of the uncertainty. As the aircraft approaches the take-off point, where the total normal force over all pads approaches zero, this component of the objective function implies that total external force in the x', y' plane parallel to the ground should be as close to zero as possible to prevent lateral motion upon take-off. In some embodiments, this component of the objective function is implemented as the sum of the measured lateral force squared magnitude at each pad, $\|_{i=1}^{N}\|f_{i,x',y'}\|^2$. In other embodiments, this component of the objective function is a more general function of the set of measured forces, $f_i$ for all i, that more strongly penalizes values of the lateral components of each $f_i$ that exceed or come close to exceeding the maximum static friction force. In other embodiments, the component is a more general function of the set of measured force vectors, $f_i$ for all i, as well as characterization of the uncertainty in the force measurements and the coefficient of static friction, that accounts for the likelihood of exceeding the maximum static friction force.

(2) As the aircraft approaches the take-off point, where the total normal force over pads 206, 208 approaches zero, the total external torque, estimated as described above from the forces measured by the force sensors 207, 209 on the pads, should be as close as possible to zero to prevent rotation around any axis upon take-off. In some embodiments, this component of the objective function is the squared magnitude of the total external torque, $\|\tau_e\|^2$. In other embodiments, it is a more general function of the total external torque and the measured contact forces, allowing non-zero torque to be penalized more strongly as the total normal contact force decreases toward zero.

(3) The lateral acceleration and rotational motion of the aircraft prior to the intended take-off time should be zero except for motion intended by the controller 110 to adjust the aircraft orientation to achieve the other goals of the objective function. Specifically, the difference in lateral acceleration and rotational motion as measured by the IMU 104 from the intended acceleration and rotational motion due to the controller's actions should be zero, with a penalty for any non-zero value of this difference. In some embodiments, this component of the objective function is a weighted sum of the squared magnitudes of the measured lateral acceleration and rotational motion, $W_\alpha \|a\|^2 + W_\omega \|\omega\|^2$. In other embodiments, this component is a more general function of a and $\omega$, as well as the intended acceleration and rotation values, as computed by the controller. In some embodiments, this is a function of the differences between the measured and intended values, $f_{\alpha\omega}(a-a_t, \omega-\omega_t)$, where $a_t$ and $\omega_t$ are the expected acceleration and rotation vectors, respectively.

(4) The component of the total external force in the direction normal to the ground should as closely as possible match the target value for this force, $f_t$, as described above, penalizing any difference from this target. In some embodiments, this component of the objective function is the squared magnitude of the difference of the measured normal component of the total external force from the target force, $\|f_{e,z}-f_t\|^2$. In other embodiments, this component of the objective function is a more general function of the measured forces and the target normal force.

In some embodiments, the overall objective function is the weighted sum of the distinct components described above. In other embodiments, the overall objective function may be a non-linear function of these components.

The controller can increase the overall lift by increasing the rotation rate of all rotors, the blade pitch of all rotors, or a combination of the two; and can decrease the overall lift by decreasing the rotation rate of all rotors, the blade pitch of all rotors, or a combination of the two. Adjusting lift in this manner can avoid modifying lateral and torsional forces on the aircraft. The term dependent on $f_{e,z}-f_t$ in the objective function embodiments, above, results in the controller attempting to track the time-varying target lift while simultaneously attempting to minimize the other terms in the objective function.

In some embodiments, the two pads 206, 208 in contact with the ground during this stage of the take-off process are symmetrically located around the longitudinal axis of the aircraft and each at the same longitudinal position. In this case, even if the center of mass is offset from the longitudinal axis, the x and z components of the pad positions in the body reference frame are equal.

To counter forces from wind in the longitudinal direction, the overall tilt of the aircraft can be adjusted so that the resulting longitudinal component of lift, which can be either forward or backward, to counter this additional force.

The controller can counter rotational torque due to wind in the yaw direction (around the z axis) by adjusting the relative rotational velocity and blade pitch to adjust the torque without necessarily modifying lift, as described previously. By separately controlling the torque of the one or both rotors rotating in one directly relative to that of one or both rotors rotating in the other direction, the overall torque applied to the aircraft can be adjusted to counter the external torque.

Torque in the roll direction can be compensated for by the controller's adjusting the relative lift from the left pair of rotors versus the right pair of rotors. Since these pairs are each counter rotating, adjusting this balance will not change the torque in the yaw direction.

Compensating for lateral force in the transverse direction requires additional behavior. Depending on the strength of this force, during the early part of the take-off process, when the normal force on the pads 206, 208 remains high, the friction of the pads 206, 208 will prevent sliding. At some point, however, that ceases to be the true, and additional corrective action must be taken. Detecting that transverse sliding would take place, the controller increases the lift along the pair of rotors on the side opposite the incoming transverse wind force, providing a roll rotation that allows one of the two pads 206, 208 to leave contact with the ground, tilting the average rotor plane in the direction of the transverse wind component. This results in a transverse thrust that can be used to counter the transverse wind force, and depends on the total thrust and the angle of tilt of the average rotor plane. As this tilt is invoked, the controller continuously adjusts the other degrees of freedom to continue to minimize the sliding forces on the remaining pad in contact with the ground, as well as rotational forces.

Under this condition, the take-off process includes a phase where a single pad 206 or 208 is in contact with the ground, and the static friction of the pad no longer counteracts any of the rotational forces, but may still counteract lateral forces in the x' and y' directions. The controller must use the available controllable degrees of freedom to avoid unwanted rotation, and may adjust the angle of the average rotor plane in both the pitch and roll directions to accomplish this.

Under extreme conditions, it is possible that while in this phase of take-off, the transverse component of wind may shift such that this component points in the opposite direction relative to longitudinal axis of the aircraft. In this case, the controller would adjust the roll such that both pads 206, 208 again come in contact with the ground. At that point, it may then reverse the above process, rolling in the opposite direction such that the other pad loses contact with the ground, leaving the opposite pad in contact.

Because the center of mass of the aircraft is affected not only by its design, but by its contents, including passengers, and can shift dynamically, the controller does not assume the center of mass is known precisely, but allows uncertainty and variability in the center of mass during the take-off process. As the controller dynamically adjusts the control degrees of freedom to minimize sliding forces and torque, asymmetry in the center of mass 210, is accounted for along with the effect of external forces. For example, asymmetry in the center of mass in the transverse dimension is similar to a roll torque in that it will result in different z component of measured load between the left and right pads, and can be compensated for by asymmetry in the left versus right rotor thrust.

The controller may make use of any of the many well-known controller algorithms, such as PID (proportional-integral-derivative), LQR (linear quadratic regulator), LQG (linear quadratic Gaussian), etc. In this embodiment, the controller is a MIMO (multi-input, multi-output) controller, having multiple sensor inputs and multiple controllable degrees of freedom. The controller may be fixed or adaptive. The controller may rely on a system model for the dynamics of aircraft, and/or the measurement noise, or the controller may be model free. The controller may learn the behavior of the system, such as through reinforcement learning, using one of a variety of well-known methods. Reinforcement learning may be trained using repeated take-off of the aircraft under a variety of conditions, either using real aircraft, simulated aircraft, or a combination.

Aircraft Configuration: Quadrotor with Horizontal Rotor Plane

In another embodiment of the invention, the aircraft is a quadcopter, with four equal-size rotors in counter-rotating pairs, and the rotors are positioned such that the average rotor plane is approximately horizontal relative to the resting position of the aircraft on the ground. In this embodiment, the aircraft rests on three or more pads. During the process of take-off, as the rotors increase their rotational speed and lift, the controller attempts to keep all pads in contact with the ground until the aircraft takes off. In this configuration, each of the pads is coupled to a set of force sensors that measure the applied forces. In this configuration, $N \geq 3$, meaning three or more pads may remain in contact with the ground until the point of take-off.

Figure 6:
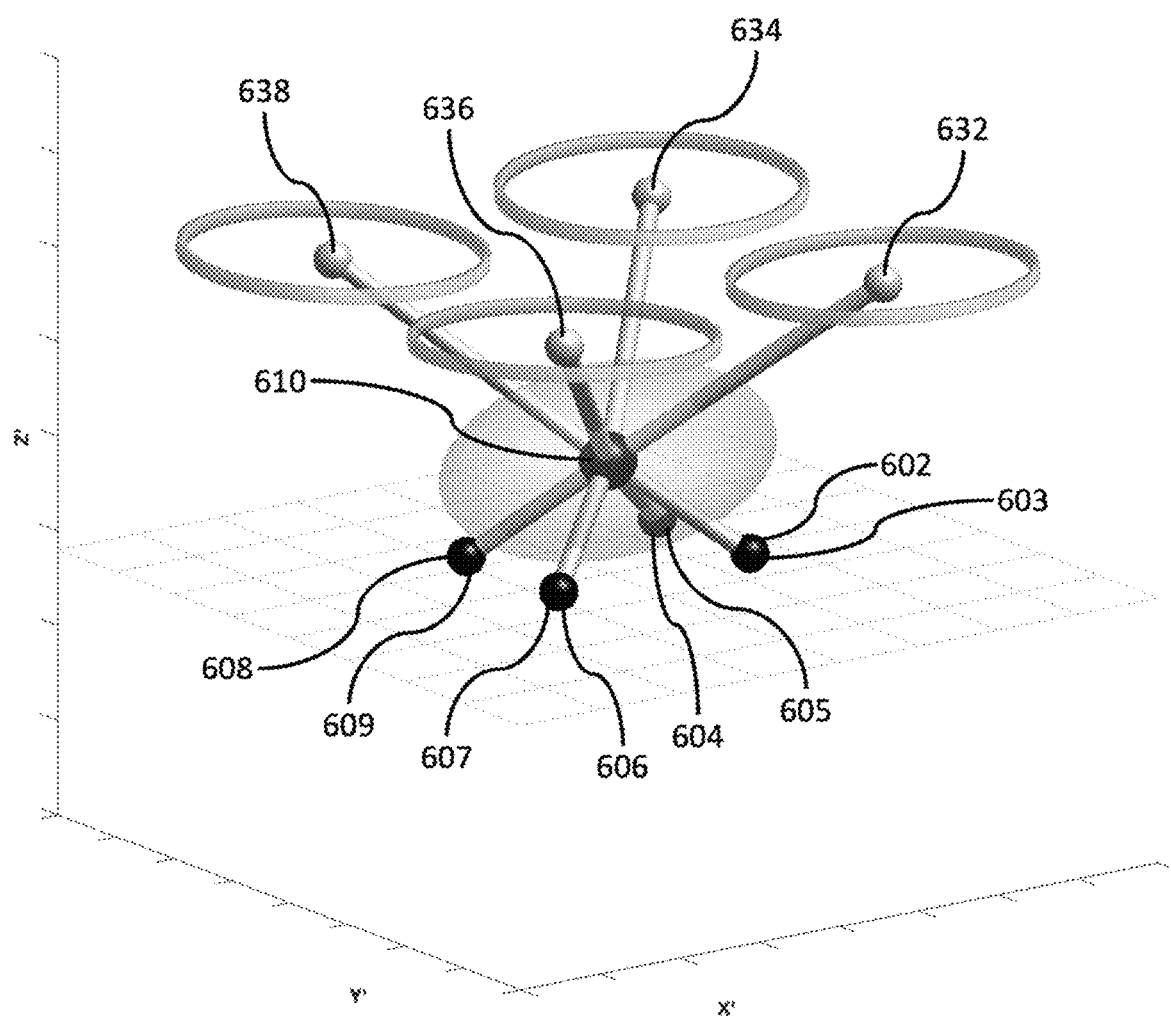
FIG. 6 is a perspective view of a schematic representation of a four-rotor aircraft configured with four pads, each of which is coupled to a set of force sensors, in contact with the ground, in accordance with an embodiment of the present invention.
Figure 7A:
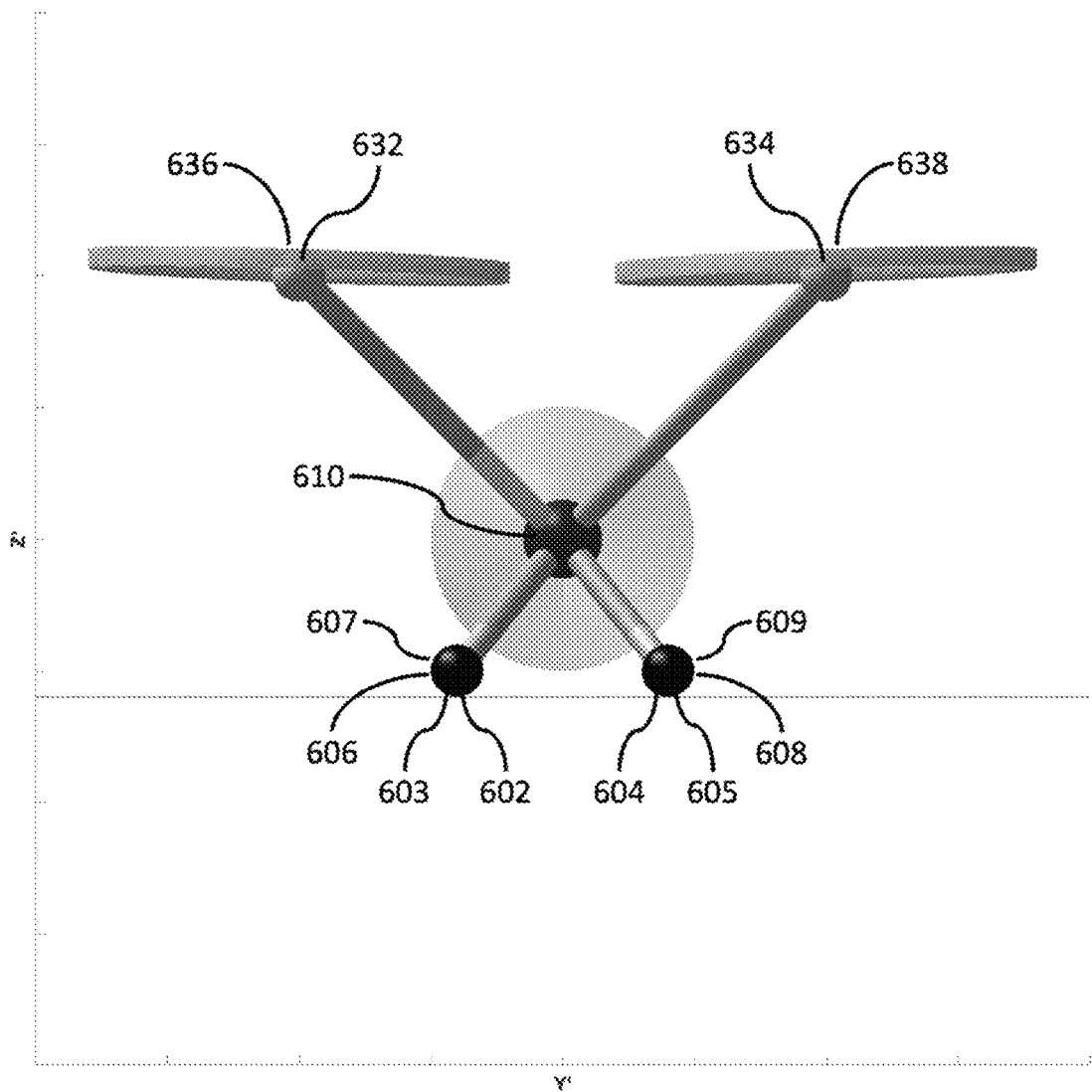
FIG. 7A is a front view of the aircraft of FIG. 6 in contact with ground.
Figure 7B:
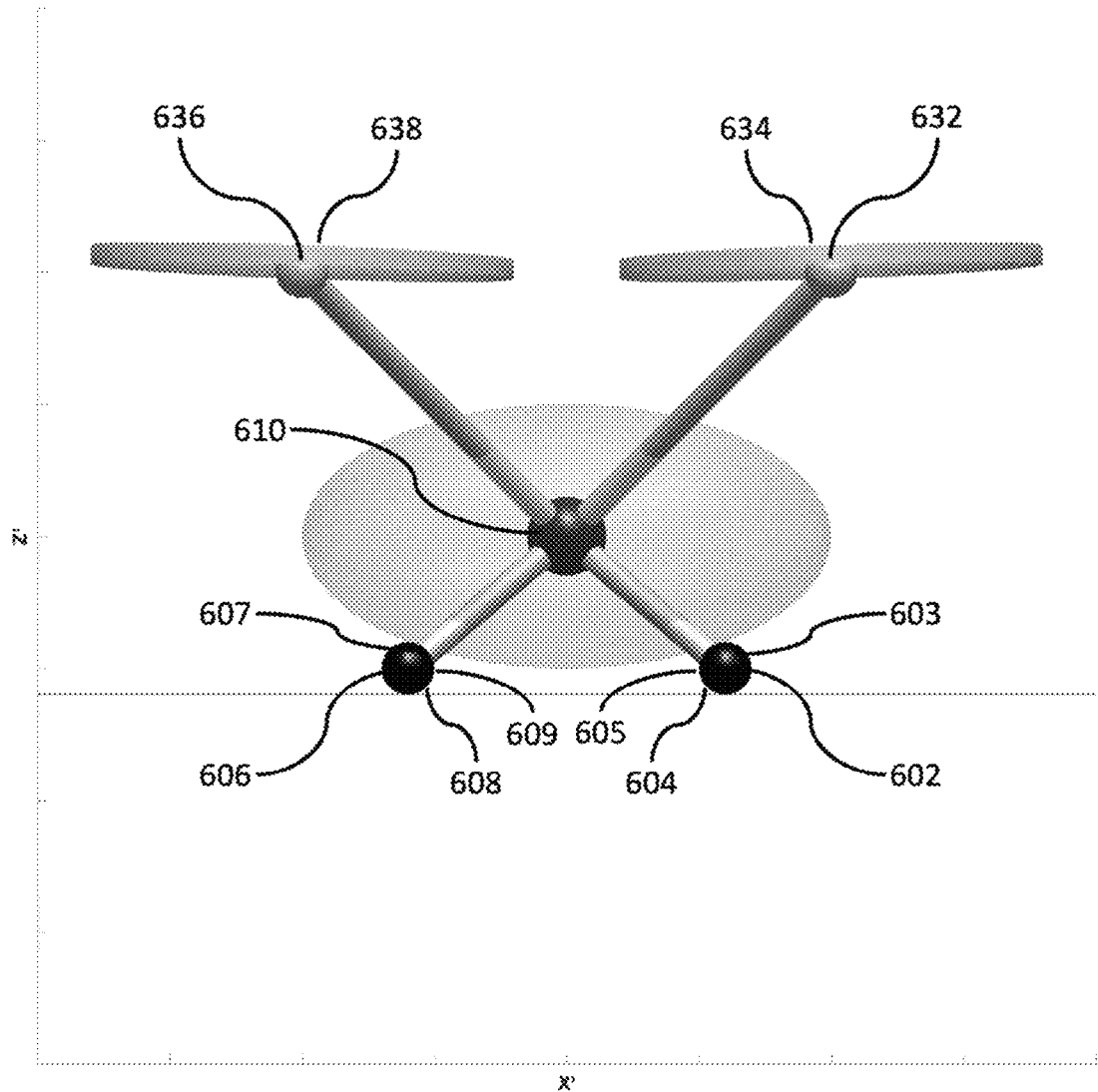
FIG. 7B is a side view of the aircraft of FIG. 6 in contact with the ground.
Figure 7C:
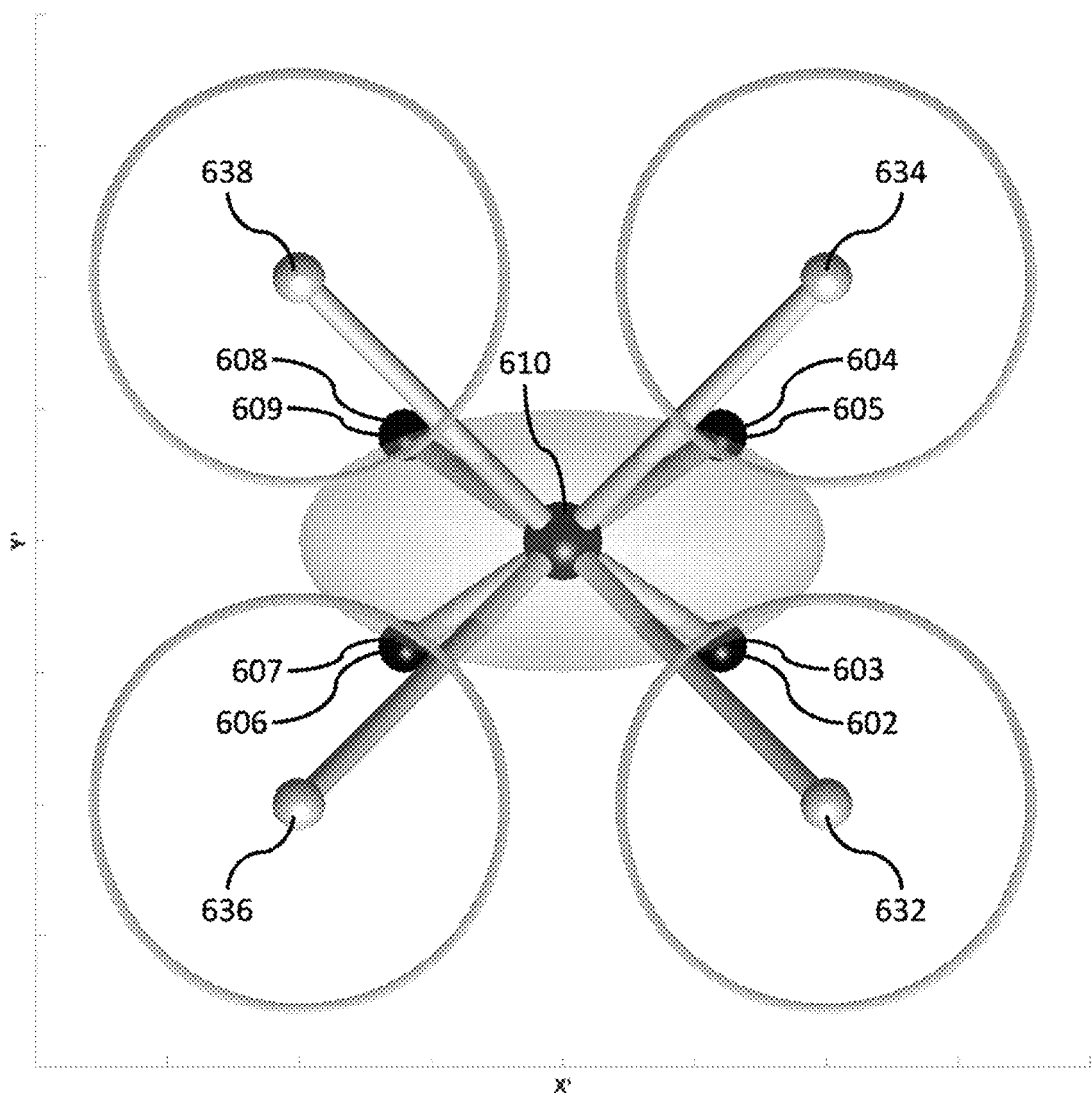
FIG. 7C is a top view of the aircraft of FIG. 6 in contact with the ground.

FIG. 6 is a perspective view of a schematic representation of a four-rotor aircraft configured with four pads arranged in an approximately rectangular configuration, each of which is coupled to a set of force sensors, in contact with the ground, in accordance with an embodiment of the present invention. In the embodiment of FIG. 6, N=4, meaning four pads may be in contact with the ground until the point of take-off. In FIG. 6, all four pads 602, 604, 606, 608 are each depicted as a dark sphere, indicating that all are coupled to sets of force sensors 603, 605, 607, 609 respectively, to sense the contact forces. As depicted in FIG. 6, the aircraft is at rest on level ground, with all four pads 602, 604, 606, 608 in contact with the ground. In this embodiment, the pads may have some compliance to ensure that all pads stay in contact with the ground even if the ground is uneven. In the specific embodiment depicted in FIG. 6, each of the four rotors 632, 634, 636, 638 has a dihedral angle of approximately 2 degrees, both in the transverse and longitudinal directions. FIGS. 7A-7C shows orthographic projections of the same aircraft configuration.

FIG. 7A is a front view of the aircraft of FIG. 6 in contact with ground.

FIG. 7B is a side view of the aircraft of FIG. 6 in contact with the ground.

FIG. 7C is a top view of the aircraft of FIG. 6 in contact with the ground.

In this configuration, with no wind, the controller 110 may increase vertical lift directly, until all pads lose contact with the ground simultaneously. With wind, the rotational forces can be countered as in the embodiment of FIG. 2, with yaw forces countered using different rotational velocities between the rotor pairs rotating in opposition directions, roll forces countered with different lift from the left rotor pair versus the right rotor pair, and pitch forces countered by different lift from the front rotor pair versus the rear rotor pair.

Early in the take-off process while the lift remains small, the static friction between the pads and the ground can counter lateral wind forces up to a certain magnitude. As the lift increases, the wind force in some direction may exceed this amount, in which case the controller 110 will apply a rotational force to tilt the aircraft up onto either two or one pad so that the average rotor plane provides a component of force that will counter the lateral wind force.

In another embodiment, N=3, meaning three pads may be in contact with the ground until the point of take-off, and there are three non-orthogonal directions that correspond to the three pairs of pads that would remain in contact with the ground in this case. In the case that the corresponding lateral component of lift is sufficient to counter the wind force in the corresponding direction, the controller uses this configuration. If this is insufficient to counter the wind from a direction not closely aligned with one of these three directions, then the controller would rotate the aircraft so that one pad remains in contact with the ground. As in the embodiment described above, changes in wind direction may require the controller returning the aircraft to two pads being in contact with the ground.

In other embodiments, the number of pads may be greater than 4. With a larger number of pads arranged in a polygonal shape, the aircraft may roll up onto any adjacent pair of pads in order to counter wind from a direction approximately normal to the line between that pair.

Aircraft Configuration: Multirotor with Tilted Rotor Plane

In another embodiment of the invention, the aircraft is a multirotor (e.g., six rotor) aircraft, where the number of rotors may be greater than 4. This configuration is similar to the quadrotor with tilted rotor plane embodiment described above, but with additional rotors. As in the previous embodiment, the average plane of the rotors is tilted forward (to be optimized for forward flight). As in the previously described embodiment in FIG. 6, each rotor may have an additional dihedral angle in the transverse or longitudinal directions. And as in that embodiment, the expected take-off behavior would be first pitch back until the average rotor plane is approximately horizontal, adjusting the angle appropriately to counter any wind, and then take-off vertically. As such, in this multirotor embodiment, the rear pads are coupled to force sensors to measure the contact forces, but any front pads need not be.

Figure 8:
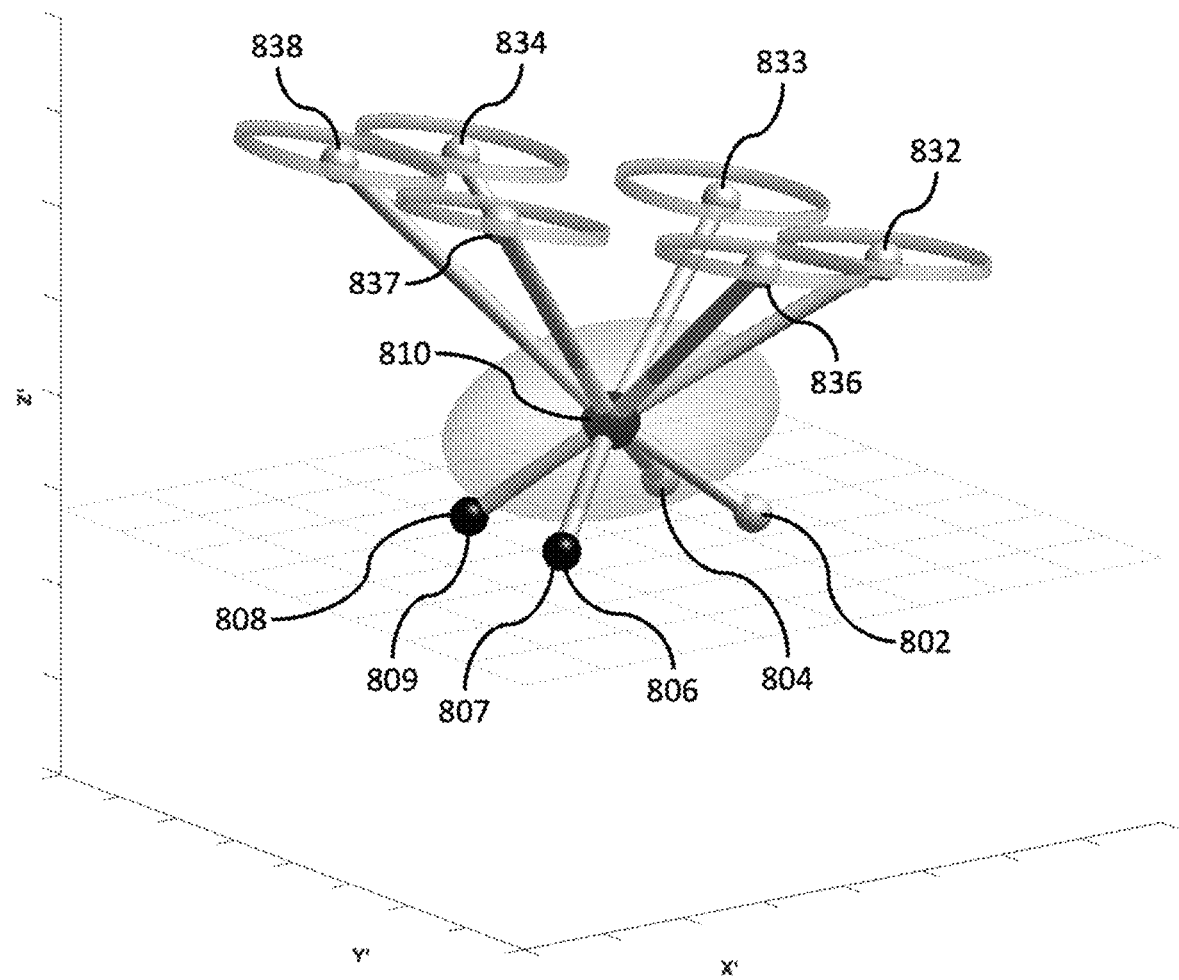
FIG. 8 is a perspective view of a schematic representation of a six-rotor aircraft configured with four pads, of which the two rear pads are each coupled to a set of force sensors, in contact with the ground, in accordance with an embodiment of the present invention.
Figure 9A:
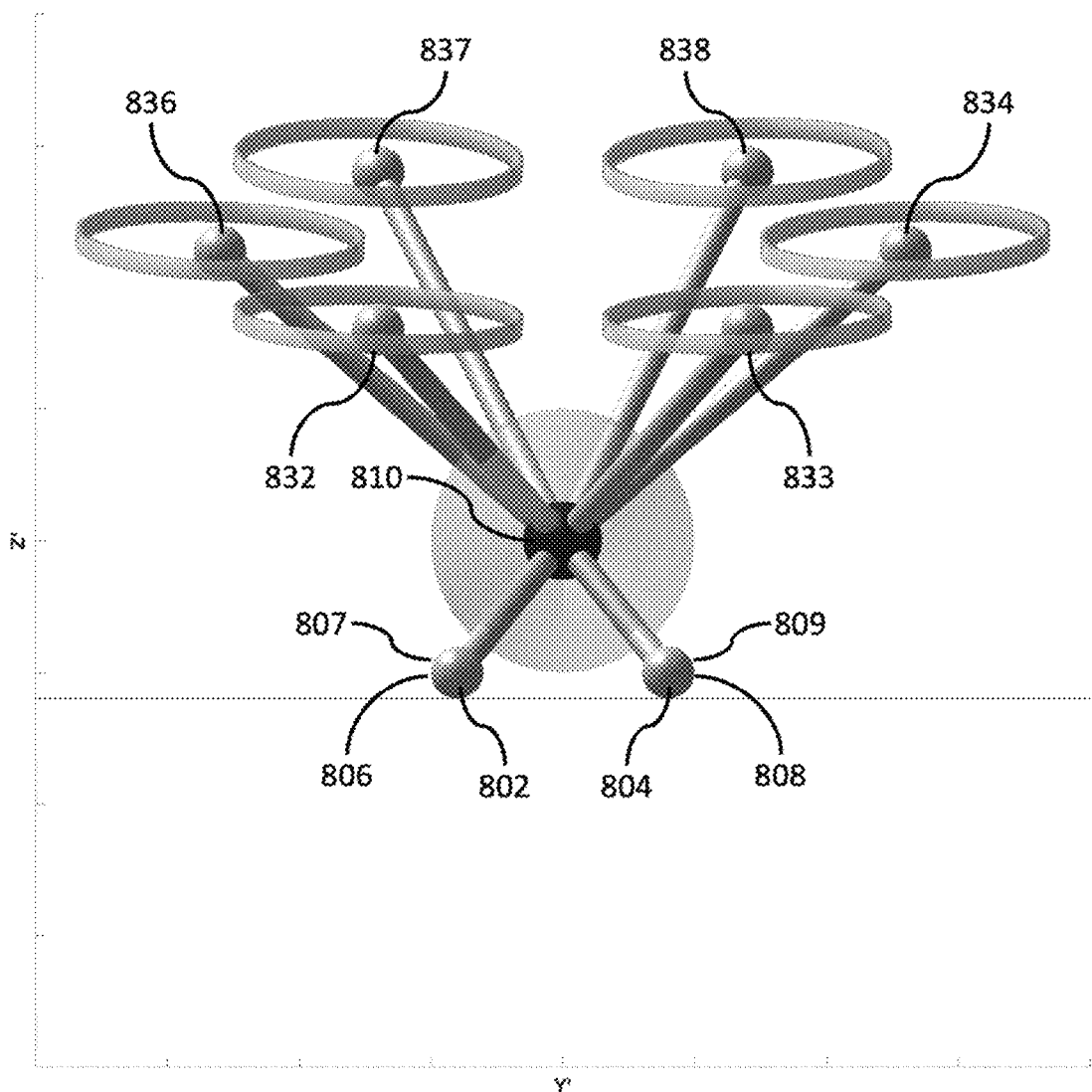
FIG. 9A is a front view of the aircraft of FIG. 8 in contact with ground.
Figure 9B:
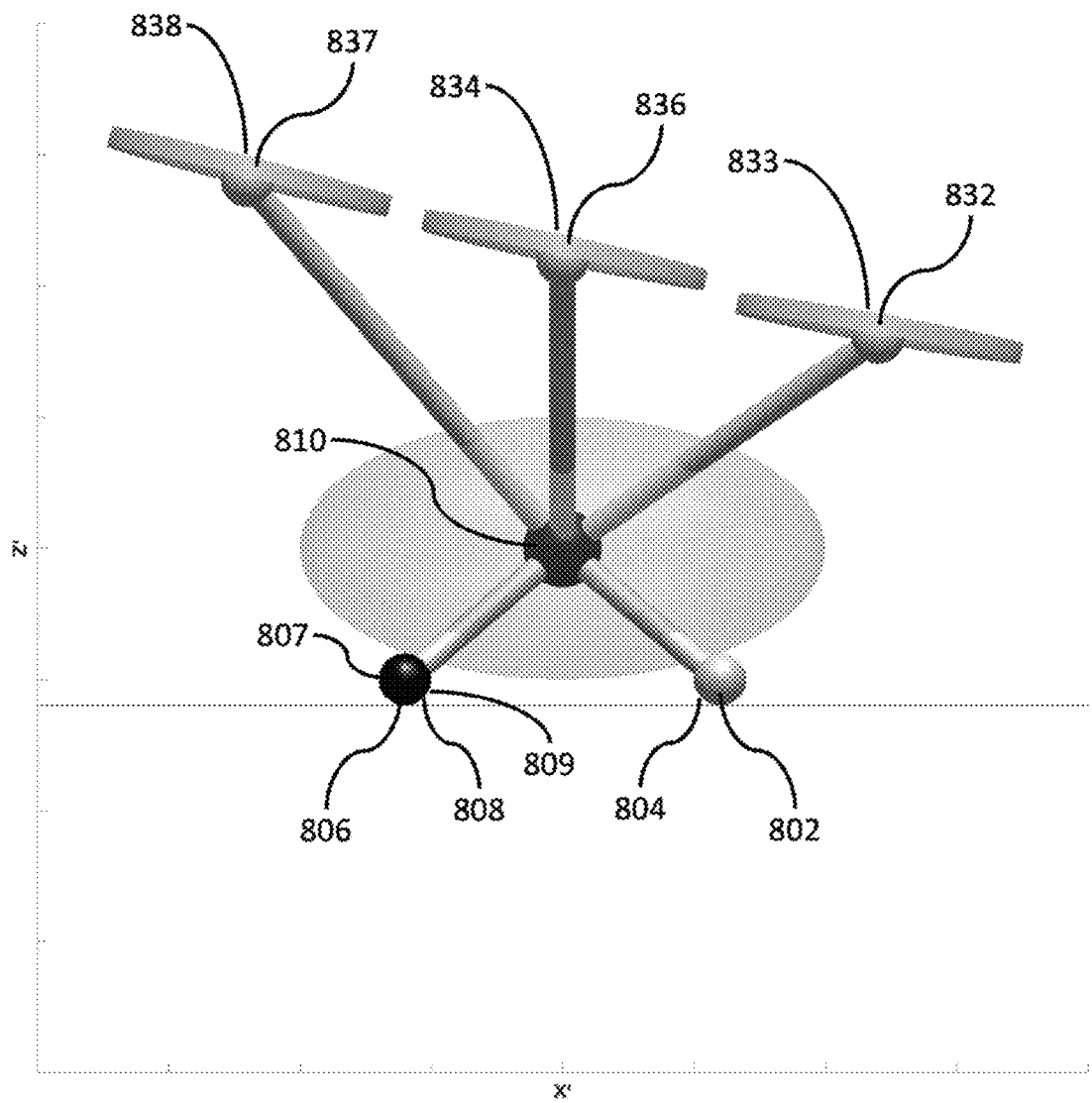
FIG. 9B is a side view of the aircraft of FIG. 8 in contact with the ground.
Figure 9C:
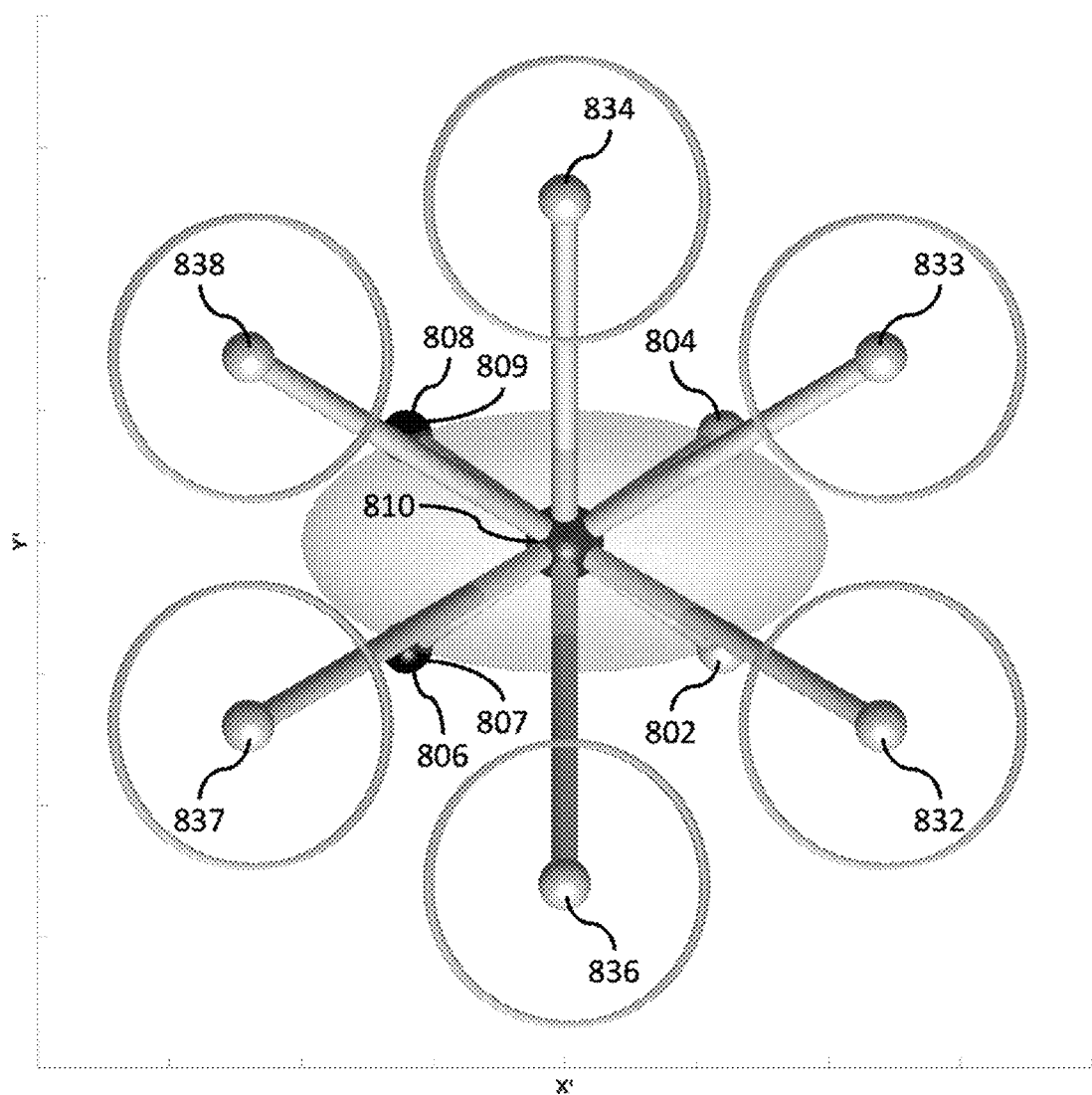
FIG. 9C is a top view of the aircraft of FIG. 8 in contact with the ground.

FIG. 8 is a perspective view of a schematic representation of a six-rotor aircraft configured with four pads, of which the two rear pads are each coupled to a set of force sensors, in contact with the ground, in accordance with an embodiment of the present invention. In FIG. 8, the aircraft is depicted at rest on level ground, with all four pads 802, 804, 806, 808 in contact with the ground, two of which 806, 808 are coupled to the sets of force sensors 807, 809, each depicted as a dark sphere. FIGS. 9A-9C shows orthographic projections of the same aircraft configuration.

FIG. 9A is a front view of the aircraft of FIG. 8 in contact with ground.

FIG. 9B is a side view of the aircraft of FIG. 8 in contact with the ground.

FIG. 9C is a top view of the aircraft of FIG. 8 in contact with the ground.

In the embodiment of FIG. 8, the take-off process is similar to that of the quadrotor with tilted rotor plane embodiment, but the controller has access to additional degrees of freedom, in that it can control the rotational velocity of each rotor, the blade pitch of each rotor, or both.

Aircraft Configuration: Multirotor with Horizontal Rotor Plane

In another embodiment of the invention, the aircraft is a multirotor aircraft, where the number of rotors may be greater than 4. This configuration is similar to the quadrotor with horizontal rotor plane embodiment described above, but with additional rotors. As in the previous embodiment, the average plane of the rotors is approximately level with the ground when the aircraft is at rest. As in the previous embodiment of FIG. 8, each rotor may have an additional dihedral angle in the transverse or longitudinal directions. And as in that embodiment of FIG. 8, the aircraft may take-off vertically, or may tilt up on any pair of pads, or individual pad, and therefore, each pad is coupled to a set of force sensors to measure the contact forces.

Figure 10:
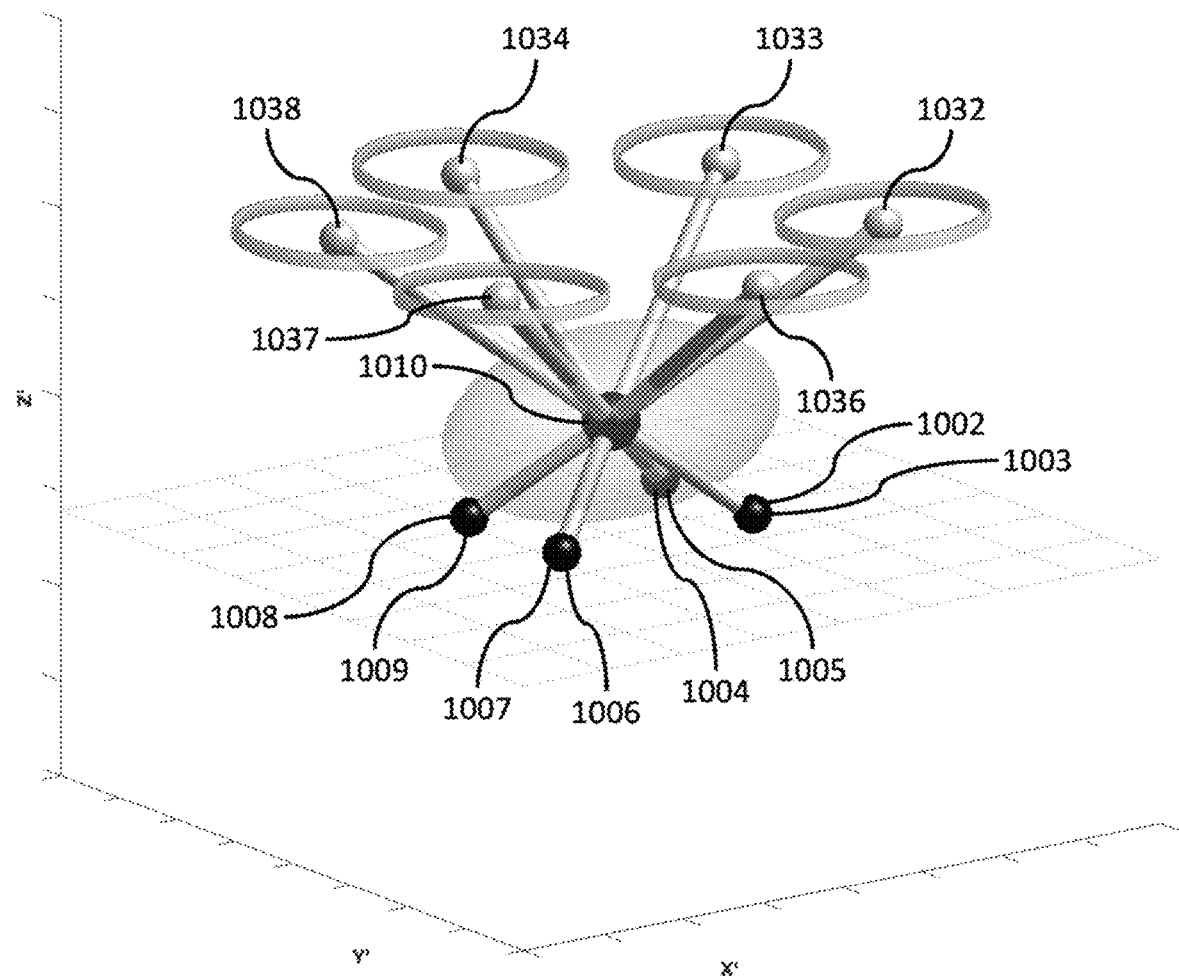
FIG. 10 is a perspective view of a schematic representation of a six-rotor aircraft configured with four pads, each of which is coupled to a set of force sensors, in contact with the ground, in accordance with an embodiment of the present invention.
Figure 11A:
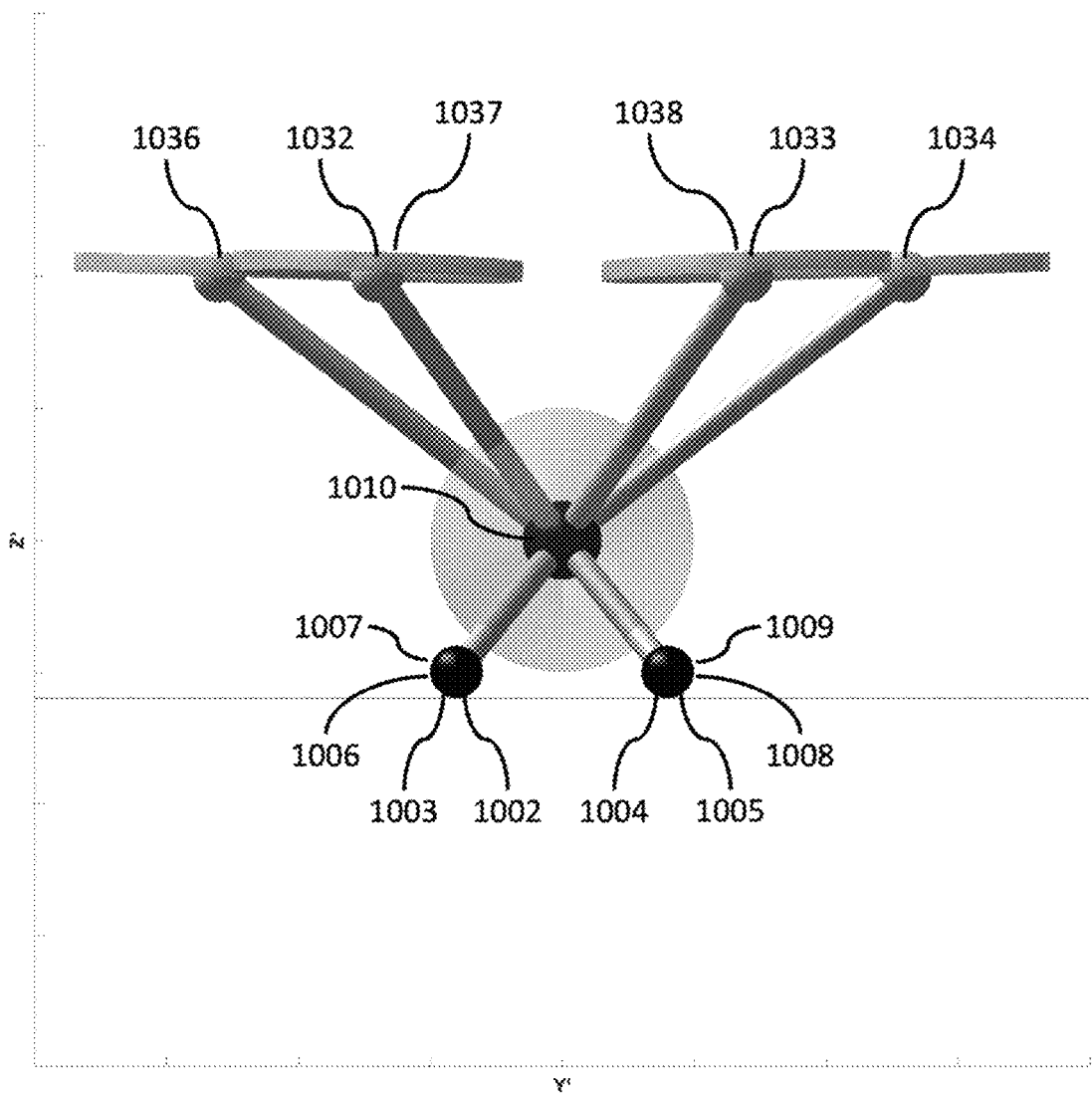
FIG. 11A is a front view of the aircraft of FIG. 10 in contact with the ground.
Figure 11B:
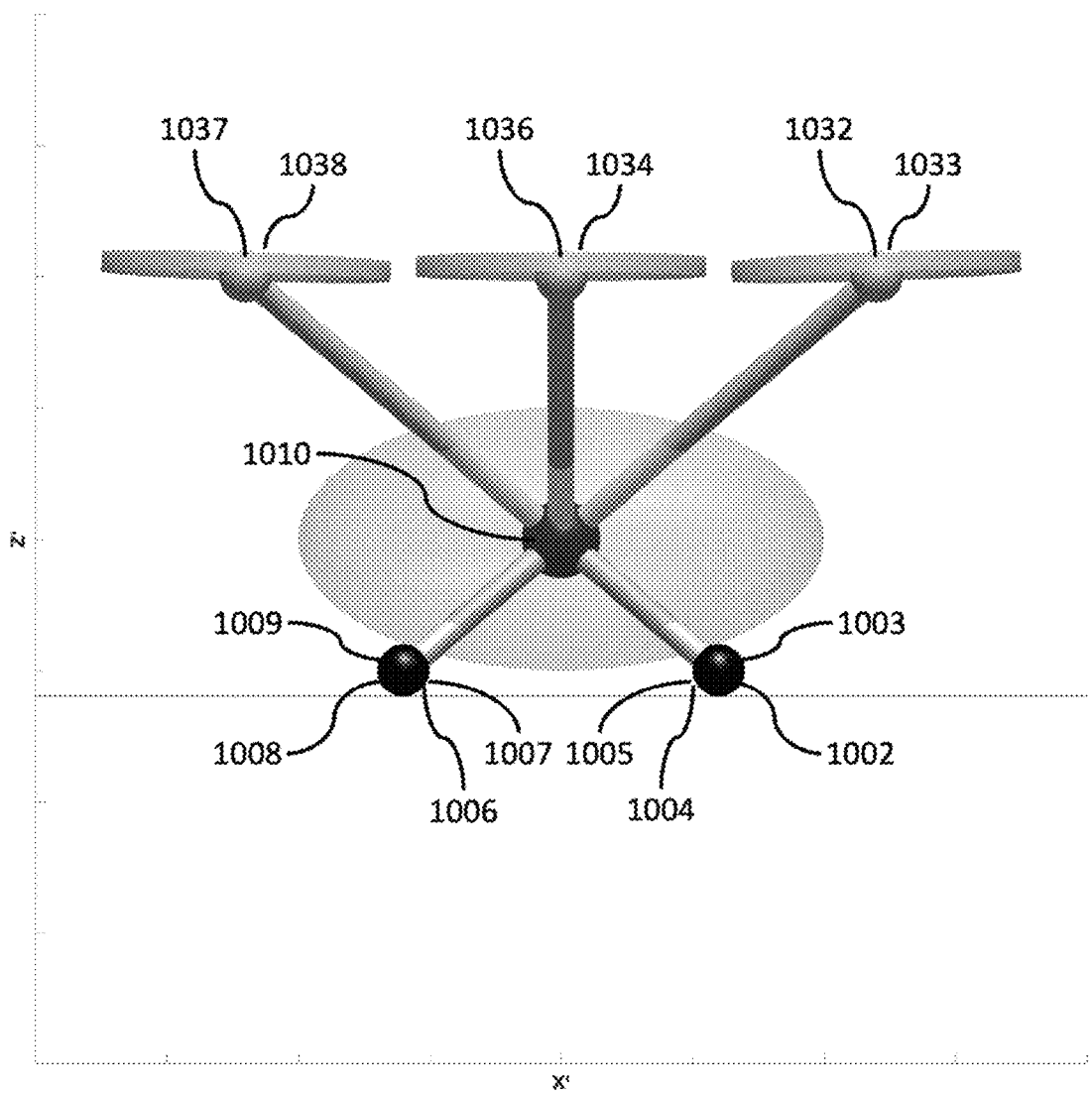
FIG. 11B is a side view of the aircraft of FIG. 10 in contact with the ground.
Figure 11C:
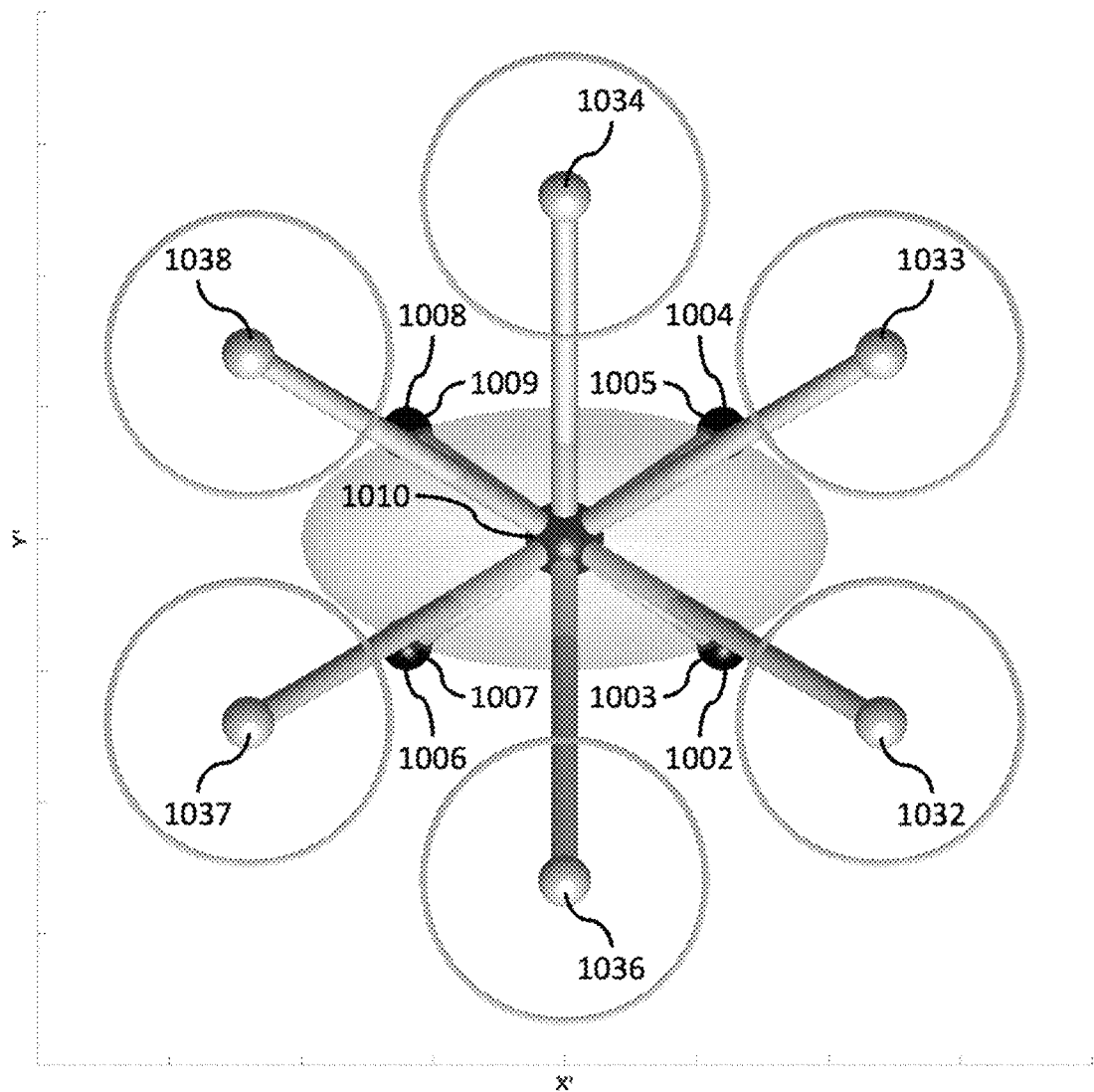
FIG. 11C is a top view of the aircraft of FIG. 10 in contact with the ground.

FIG. 10 is a perspective view of a schematic representation of a six-rotor aircraft configured with four pads, each of which is coupled to a set of force sensors, in contact with the ground, in accordance with an embodiment of the present invention. In FIG. 10, the aircraft is depicted at rest on level ground, with all four pads 1002, 1004, 1006, 1008 in contact with the ground, each of which is coupled to a set of force sensors 1003, 1005, 1007, 1009, each depicted as a dark sphere. The aircraft has six rotors rotor 1032, 1033, 1034, 1036, 1037, 1038. FIGS. 11A-11C shows orthographic projections of the same aircraft configuration.

FIG. 11A is a front view of the aircraft of FIG. 10 in contact with the ground.

FIG. 11B is a side view of the aircraft of FIG. 10 in contact with the ground.

FIG. 11C is a top view of the aircraft of FIG. 10 in contact with the ground.

In the embodiment of FIG. 10, the take-off process is similar to that of the quadrotor with horizontal rotor plane embodiment, but the controller has access to additional degrees of freedom, in that it can control the rotational velocity of each rotor, the blade pitch of each rotor, or both.

Other Aircraft Configurations

In another embodiment of the invention, one or more of the rotors have a variable orientation, allowing the degree of tilt around at least one axis to be modified. In this embodiment, the controller 110 incorporates the ability to control the degree of tilt of each such rotor around each such axis within specified limits (or more generally to control the direction of thrust from each rotor). As the force provided by each rotor is approximately directed perpendicular to the plane of that rotor, this provides the controller 110 with additional degrees of freedom in controlling the total force and torque used to suitably counteract external forces.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A vertical takeoff aircraft comprising:
a set of pads that are in contact with the ground when the aircraft is on the ground;
a controllable lift and propulsion system;
an array of force sensors coupled to the set of pads, the array having an output providing a measurement stream of forces exerted on the pads, along at least two independent axes, while the aircraft has at least one pad of the set in contact with the ground and is in transition to flight; and
a controller, coupled to the lift and propulsion system and to the array of force sensors, the controller configured to control the lift and propulsion system, based on the measurement stream of forces, in a manner to counteract forces exerted externally on the aircraft during the transition.

2. The vertical takeoff aircraft according to claim 1, wherein the controller is configured to control the lift and propulsion system in a manner to minimize a scalar-valued objective function that penalizes a series of undesirable conditions.

3. The vertical takeoff aircraft according to claim 2, wherein the objective function is configured so that total force applied to the aircraft in a plane parallel to the ground is close to zero upon take-off.

4. The vertical takeoff aircraft according to claim 2, wherein the objective function is configured so that total torque applied to the aircraft in a plane parallel to the ground is close to zero upon take-off.

5. The vertical takeoff aircraft according to claim 1, wherein the controller is further coupled to a set of flight controls, and the controller is configured to control the lift and propulsion system based on indications of desired aircraft behavior provided by a pilot through the set of flight controls.

6. The vertical takeoff aircraft according to claim 1, wherein the controller is further coupled to an inertial measurement unit (IMU), and the controller is configured to control the lift and propulsion system based on acceleration and rotational motion measured by the IMU.

7. The vertical takeoff aircraft according to claim 6, configured for takeoff when on non-level ground, wherein the controller is configured to use the IMU to determine when the aircraft is on non-level ground and to control the lift and propulsion system in a manner taking into account the non-level ground.

8. The vertical takeoff aircraft according to claim 1, wherein each force sensor in the array is a load cell having an analog front end (AFE) connected to an analog to digital converter (ADC).

9. The vertical takeoff aircraft according to claim 1, wherein the lift and propulsion system includes a set of rotors, each rotor coupled to (i) a motor control operated by the controller to adjust rotational velocity of such rotor, and (ii) a blade pitch control operated by the controller to adjust pitch angle of such rotor's blades.

10. The vertical takeoff aircraft according to claim 9, wherein for each rotor, the controller adjusts (i) the rotational velocity of the rotor, by operating the motor control, and (ii) the pitch angle of the rotor's blades, by operating the blade pitch control, to counteract the forces exerted externally on the aircraft.

11. The vertical takeoff aircraft according to claim 9, wherein each rotor has a rotational plane that is tilted at a tilt angle, relative to the aircraft's position when at rest on the ground, that is adjustable by the controller.

12. The vertical takeoff aircraft according to claim 11, wherein the controller is configured to adjust, in the course of takeoff, for each rotor, at least two parameters selected from the group consisting of tilt angle, rotational velocity, and blade pitch.

13. The vertical takeoff aircraft according to claim 9, wherein the set of rotors includes a front set of rotors and a rear set of rotors, and the controller is configured to adjust thrust of the front set of rotors relative to thrust of the rear set of rotors to maintain a desired aircraft pitch orientation when on the ground and transitioning from the ground to flight.

14. The vertical takeoff aircraft according to claim 9, wherein the set of rotors includes four rotors.

15. The vertical takeoff aircraft according to claim 9, wherein the set of rotors includes six rotors.

16. The vertical takeoff aircraft according to claim 1, wherein the set of pads includes a front set of pads and a rear set of pads, and the array of force sensors is coupled to the rear set of pads.

17. The vertical takeoff aircraft according to claim 1, wherein the set of pads includes four pads.

18. The vertical takeoff aircraft according to claim 1, wherein at least one pad of the set of pads is coupled to three force sensors, arranged to measure the forces exerted externally on the aircraft in each of three directions.

* * * * *